(12) United States Patent
Lin et al.

(10) Patent No.: US 9,953,223 B2
(45) Date of Patent: *Apr. 24, 2018

(54) METHODS AND SYSTEMS FOR ASSIGNING PIXELS DISTANCE-COST VALUES USING A FLOOD FILL TECHNIQUE

(71) Applicant: PERSONIFY, INC., Chicago, IL (US)

(72) Inventors: Dennis Lin, Chicago, IL (US); Quang Nguyen, Ho Chi Minh (VN); Gia Dang, Ho Chi Minh (VN); Yi Zhang, Chicago, IL (US); Simion Venshtain, Chicago, IL (US); Cong Nguyen, Ho Chi Minh (VN)

(73) Assignee: Personify, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/425,331

(22) Filed: Feb. 6, 2017

(65) Prior Publication Data

US 2017/0147882 A1  May 25, 2017

Related U.S. Application Data

(63) Continuation of application No. 14/716,495, filed on May 19, 2015, now Pat. No. 9,563,962.

(51) Int. Cl.
*G06K 9/34* (2006.01)
*G06K 9/00* (2006.01)
(Continued)

(52) U.S. Cl.
CPC ..... *G06K 9/00718* (2013.01); *G06K 9/00758* (2013.01); *G06K 9/4604* (2013.01);
(Continued)

(58) Field of Classification Search
None
See application file for complete search history.

(56) References Cited

U.S. PATENT DOCUMENTS

| 5,001,558 A | 3/1991 | Burley |
| 5,022,085 A | 6/1991 | Cok |

(Continued)

FOREIGN PATENT DOCUMENTS

| CN | 101286199 | * 10/2008 |
| WO | 2013019259 | 2/2013 |

OTHER PUBLICATIONS

Yacoob, Y.; Davis, L., "Detection, analysis and matching of hair," in Computer Vision, 2005. ICCV 2005. Tenth IEEE International Conference on , vol. 1, No., pp. 741-748 vol. 1, Oct. 17-21, 2005.*

(Continued)

*Primary Examiner* — Andrae S Allison
(74) *Attorney, Agent, or Firm* — Invention Mine LLC

(57) ABSTRACT

Disclosed herein are methods and systems for assigning pixels distance-cost values using a flood fill technique. One embodiment takes the form of a process that includes obtaining video data depicting a head of a user, obtaining depth data associated with the video data, and selecting seed pixels for a flood fill at least in part by using the depth information. The process also includes performing the flood fill from the selected seed pixels. The flood fill assigns respective distance-cost values to pixels of the video data based on position-space cost values and color-space cost values. In some embodiments, the process also includes classifying pixels of the video data as foreground based at least in part on the assigned distance-cost values. In some other embodiments, the process also includes assigning pixels of the video data foreground-likelihood values based at least in part on the assigned distance-cost values.

16 Claims, 14 Drawing Sheets

(51) Int. Cl.
  *G06T 7/50* (2017.01)
  *G06T 7/73* (2017.01)
  *G06K 9/46* (2006.01)
  *G06T 7/00* (2017.01)
  *G06K 9/52* (2006.01)
  *G06T 7/194* (2017.01)

(52) U.S. Cl.
  CPC ............ *G06K 9/4652* (2013.01); *G06K 9/52* (2013.01); *G06T 7/0002* (2013.01); *G06T 7/194* (2017.01); *G06T 7/50* (2017.01); *G06T 7/73* (2017.01); *G06T 2207/10016* (2013.01); *G06T 2207/10024* (2013.01); *G06T 2207/10028* (2013.01); *G06T 2207/20156* (2013.01); *G06T 2207/30196* (2013.01)

(56) References Cited

U.S. PATENT DOCUMENTS

| | | |
|---|---|---|
| 5,117,283 A | 5/1992 | Kroos |
| 5,227,985 A | 7/1993 | Dementhon |
| 5,343,311 A | 8/1994 | Morag |
| 5,506,946 A | 4/1996 | Bar |
| 5,517,334 A | 5/1996 | Morag |
| 5,534,917 A | 7/1996 | MacDougall |
| 5,581,276 A | 12/1996 | Cipolla |
| 5,631,697 A | 5/1997 | Nishimura |
| 5,687,306 A | 11/1997 | Blank |
| 5,875,040 A | 2/1999 | Matraszek |
| 6,119,147 A | 9/2000 | Toomey |
| 6,125,194 A | 9/2000 | Yeh |
| 6,150,930 A | 11/2000 | Cooper |
| 6,288,703 B1 | 9/2001 | Berman |
| 6,411,744 B1 | 6/2002 | Edwards |
| 6,618,444 B1 | 9/2003 | Haskell |
| 6,661,918 B1 | 12/2003 | Gordon |
| 6,664,973 B1 | 12/2003 | Iwamoto |
| 6,760,749 B1 | 7/2004 | Dunlap |
| 6,798,407 B1 | 9/2004 | Benman |
| 6,937,744 B1 * | 8/2005 | Toyama .................. G06T 7/20 348/14.1 |
| 6,973,201 B1 | 12/2005 | Colmenarez |
| 7,050,070 B2 | 5/2006 | Ida |
| 7,124,164 B1 | 10/2006 | Chemtob |
| 7,317,830 B1 | 1/2008 | Gordon |
| 7,386,799 B1 | 6/2008 | Clanton |
| 7,420,490 B2 | 9/2008 | Gupta |
| 7,420,590 B2 | 9/2008 | Matusik |
| 7,463,296 B2 | 12/2008 | Sun |
| 7,512,262 B2 | 3/2009 | Criminisi |
| 7,518,051 B2 | 4/2009 | Redmann |
| 7,574,043 B2 | 8/2009 | Porikli |
| 7,599,555 B2 | 10/2009 | McGuire |
| 7,602,990 B2 | 10/2009 | Matusik |
| 7,631,151 B2 | 12/2009 | Prahlad |
| 7,633,511 B2 | 12/2009 | Shum |
| 7,634,533 B2 | 12/2009 | Rudolph |
| 7,668,371 B2 | 2/2010 | Dorai |
| 7,676,081 B2 * | 3/2010 | Blake ................ G06K 9/00234 358/538 |
| 7,692,664 B2 | 4/2010 | Weiss |
| 7,720,283 B2 | 5/2010 | Sun |
| 7,742,650 B2 | 6/2010 | Xu |
| 7,747,044 B2 | 6/2010 | Baker |
| 7,755,016 B2 | 7/2010 | Toda |
| 7,773,136 B2 | 8/2010 | Ohyama |
| 7,821,552 B2 | 10/2010 | Suzuki |
| 7,831,087 B2 | 11/2010 | Harville |
| 7,912,246 B1 | 3/2011 | Moon |
| 7,965,885 B2 | 6/2011 | Iwai |
| 8,073,196 B2 | 12/2011 | Yuan |
| 8,094,928 B2 | 1/2012 | Graepel |
| 8,131,011 B2 | 3/2012 | Nevatia |
| 8,146,005 B2 | 3/2012 | Jones |
| 8,175,379 B2 | 5/2012 | Wang |
| 8,175,384 B1 | 5/2012 | Wang |
| 8,204,316 B2 | 6/2012 | Panahpour |
| 8,225,208 B2 | 7/2012 | Sprang |
| 8,238,605 B2 | 8/2012 | Chien |
| 8,249,333 B2 | 8/2012 | Agarwal |
| 8,264,544 B1 | 9/2012 | Chang |
| 8,300,890 B1 | 10/2012 | Gaikwad |
| 8,300,938 B2 | 10/2012 | Can |
| 8,320,666 B2 | 11/2012 | Gong |
| 8,331,619 B2 | 12/2012 | Ikenoue |
| 8,331,685 B2 | 12/2012 | Pettigrew |
| 8,335,379 B2 | 12/2012 | Malik |
| 8,345,082 B2 | 1/2013 | Tysso |
| 8,355,379 B2 | 1/2013 | Thomas |
| 8,363,908 B2 | 1/2013 | Steinberg |
| 8,379,101 B2 | 2/2013 | Mathe |
| 8,411,149 B2 | 2/2013 | Maison |
| 8,396,328 B2 | 3/2013 | Sandrew |
| 8,406,494 B2 | 3/2013 | Zhan |
| 8,411,948 B2 | 4/2013 | Rather |
| 8,422,769 B2 | 4/2013 | Rather |
| 8,437,570 B2 | 5/2013 | Criminisi |
| 8,446,459 B2 | 5/2013 | Fang |
| 8,446,488 B2 | 5/2013 | Yim |
| 8,477,149 B2 | 7/2013 | Beato |
| 8,503,720 B2 | 8/2013 | Shotton |
| 8,533,593 B2 | 9/2013 | Grossman |
| 8,533,594 B2 | 9/2013 | Grossman |
| 8,533,595 B2 | 9/2013 | Grossman |
| 8,565,485 B2 | 10/2013 | Craig |
| 8,588,515 B2 | 11/2013 | Bang |
| 8,625,897 B2 | 1/2014 | Criminisi |
| 8,643,701 B2 | 2/2014 | Nguyen |
| 8,649,592 B2 | 2/2014 | Nguyen |
| 8,649,932 B2 | 2/2014 | Mian |
| 8,655,069 B2 | 2/2014 | Rather |
| 8,659,658 B2 | 2/2014 | Vassigh |
| 8,666,153 B2 | 3/2014 | Hung |
| 8,682,072 B2 | 3/2014 | Sengamedu |
| 8,701,002 B2 | 4/2014 | Grossman |
| 8,723,914 B2 | 5/2014 | Mackie |
| 8,818,028 B2 | 8/2014 | Nguyen |
| 8,831,285 B2 | 9/2014 | Kang |
| 8,854,412 B2 | 10/2014 | Tian |
| 8,874,525 B2 | 10/2014 | Grossman |
| 8,890,923 B2 | 11/2014 | Tian |
| 8,890,929 B2 | 11/2014 | Paithankar |
| 8,897,562 B2 | 11/2014 | Bai |
| 8,913,847 B2 | 12/2014 | Tang |
| 8,994,778 B2 | 3/2015 | Weiser |
| 9,008,457 B2 | 4/2015 | Dikmen |
| 9,053,573 B2 | 6/2015 | Lin |
| 9,065,973 B2 | 6/2015 | Graham |
| 9,084,928 B2 | 7/2015 | Klang |
| 9,087,229 B2 | 7/2015 | Nguyen |
| 9,088,692 B2 | 7/2015 | Carter |
| 9,117,310 B2 | 8/2015 | Coene |
| 9,269,153 B2 | 2/2016 | Gandolph |
| 9,285,951 B2 | 3/2016 | Makofsky |
| 9,336,610 B2 | 5/2016 | Ohashi |
| 9,542,626 B2 | 1/2017 | Martinson |
| 2002/0012072 A1 | 1/2002 | Toyama |
| 2002/0025066 A1 | 2/2002 | Pettigrew |
| 2002/0051491 A1 | 5/2002 | Challapali |
| 2002/0158873 A1 | 10/2002 | Williamson |
| 2004/0004626 A1 | 1/2004 | Ida |
| 2004/0153671 A1 | 8/2004 | Schuyler |
| 2004/0175021 A1 | 9/2004 | Porter |
| 2005/0063565 A1 | 3/2005 | Nagaoka |
| 2005/0094879 A1 | 5/2005 | Harville |
| 2005/0219264 A1 | 10/2005 | Shum |
| 2005/0219391 A1 | 10/2005 | Sun |
| 2005/0262201 A1 | 11/2005 | Rudolph |
| 2006/0072022 A1 | 4/2006 | Iwai |
| 2006/0193509 A1 | 8/2006 | Criminisi |
| 2006/0221248 A1 | 10/2006 | McGuire |
| 2006/0259552 A1 | 11/2006 | Mock |
| 2006/0291697 A1 | 12/2006 | Luo |

(56) References Cited

U.S. PATENT DOCUMENTS

| | | |
|---|---|---|
| 2007/0036432 A1 | 2/2007 | Xu |
| 2007/0070200 A1 | 3/2007 | Matusik |
| 2007/0110298 A1 | 5/2007 | Graepel |
| 2007/0133880 A1* | 6/2007 | Sun .................... G06K 9/38 382/195 |
| 2007/0146512 A1 | 6/2007 | Suzuki |
| 2007/0201738 A1 | 8/2007 | Toda |
| 2007/0269108 A1* | 11/2007 | Steinberg ........... G06K 9/00234 382/173 |
| 2008/0109724 A1 | 5/2008 | Gallmeier |
| 2008/0181507 A1 | 7/2008 | Gope |
| 2008/0219554 A1* | 9/2008 | Dorai ................. G06K 9/00624 382/173 |
| 2008/0266380 A1 | 10/2008 | Gorzynski |
| 2008/0273751 A1 | 11/2008 | Yuan |
| 2009/0003687 A1 | 1/2009 | Agarwal |
| 2009/0044113 A1 | 2/2009 | Jones |
| 2009/0110299 A1 | 4/2009 | Panahpour |
| 2009/0144651 A1 | 6/2009 | Sprang |
| 2009/0199111 A1 | 8/2009 | Emori |
| 2009/0244309 A1 | 10/2009 | Maison |
| 2009/0245571 A1 | 10/2009 | Chien |
| 2009/0249863 A1 | 10/2009 | Kim |
| 2009/0278859 A1 | 11/2009 | Weiss |
| 2009/0284627 A1 | 11/2009 | Bando |
| 2009/0290795 A1* | 11/2009 | Criminisi ............. G06K 9/342 382/173 |
| 2009/0300553 A1 | 12/2009 | Pettigrew |
| 2010/0027961 A1 | 2/2010 | Gentile |
| 2010/0034457 A1 | 2/2010 | Berliner |
| 2010/0046830 A1 | 2/2010 | Wang |
| 2010/0053212 A1 | 3/2010 | Kang |
| 2010/0128927 A1 | 5/2010 | Ikenoue |
| 2010/0166325 A1 | 7/2010 | Sengamedu |
| 2010/0171807 A1 | 7/2010 | Tysso |
| 2010/0195898 A1 | 8/2010 | Bang |
| 2010/0278384 A1* | 11/2010 | Shotton ............. G06K 9/00369 382/103 |
| 2010/0302376 A1 | 12/2010 | Boulanger |
| 2010/0302395 A1* | 12/2010 | Mathe ................ G06K 9/00342 348/222.1 |
| 2010/0329544 A1 | 12/2010 | Sabe |
| 2011/0007183 A1 | 1/2011 | Kahlman |
| 2011/0038536 A1 | 2/2011 | Gong |
| 2011/0090311 A1 | 4/2011 | Fang |
| 2011/0115886 A1 | 5/2011 | Nguyen |
| 2011/0158529 A1 | 6/2011 | Malik |
| 2011/0193939 A1 | 8/2011 | Vassigh |
| 2011/0216965 A1 | 9/2011 | Rather |
| 2011/0216975 A1 | 9/2011 | Rather |
| 2011/0216976 A1 | 9/2011 | Rather |
| 2011/0242277 A1 | 10/2011 | Do |
| 2011/0243430 A1 | 10/2011 | Hung |
| 2011/0249190 A1 | 10/2011 | Nguyen |
| 2011/0249863 A1 | 10/2011 | Ohashi |
| 2011/0249883 A1 | 10/2011 | Can |
| 2011/0267348 A1 | 11/2011 | Lin |
| 2011/0293179 A1 | 12/2011 | Dikmen |
| 2011/0293180 A1* | 12/2011 | Criminisi ................ G06K 9/38 382/173 |
| 2012/0051631 A1 | 3/2012 | Nguyen |
| 2012/0127259 A1 | 5/2012 | Mackie |
| 2012/0314077 A1 | 12/2012 | Clavenna, II |
| 2013/0016097 A1 | 1/2013 | Coene |
| 2013/0028476 A1 | 1/2013 | Craig |
| 2013/0094780 A1 | 4/2013 | Tang |
| 2013/0110565 A1 | 5/2013 | Means |
| 2013/0129205 A1 | 5/2013 | Wang |
| 2013/0142452 A1 | 6/2013 | Shionozaki |
| 2013/0147900 A1 | 6/2013 | Weiser |
| 2013/0243313 A1 | 9/2013 | Civit |
| 2013/0335506 A1 | 12/2013 | Carter |
| 2014/0003719 A1 | 1/2014 | Bai |
| 2014/0029788 A1 | 1/2014 | Kang |
| 2014/0063177 A1 | 3/2014 | Tian |
| 2014/0085398 A1 | 3/2014 | Tian |
| 2014/0112547 A1 | 4/2014 | Peeper |
| 2014/0119642 A1 | 5/2014 | Lee |
| 2014/0153784 A1 | 6/2014 | Gandolph |
| 2014/0229850 A1 | 8/2014 | Makofsky |
| 2014/0300630 A1 | 10/2014 | Flider |
| 2014/0307056 A1 | 10/2014 | Romea |
| 2017/0208243 A1 | 7/2017 | Masad |

OTHER PUBLICATIONS

Talukder, A.; Goldberg, S.; Matthies, L.; Ansar, A., "Real-time detection of moving objects in a dynamic scene from moving robotic vehicles," in Intelligent Robots and Systems, 2003. (IROS 2003). Proceedings. 2003 IEEE/RSJ International Conference on , vol. 2, No., pp. 1308-1313 vol. 2, Oct. 27-31, 2003.*

G. Sheasby, J. Valentin, N. Crook, and P. H. S. Torr. A robust stereo prior for human segmentation. In ACCV, 2012.*

M. Hradis, R. Juranek, "Real-time Tracking of Participants in Meeting Video", Proceedings of CESCG, Wien, 2006.*

Arbelaez, P., et ,al., "Contour detection and hierarchical image segmentation", Pattern Analysis and Machine Intelligence, IEEE Transactions on 33.4 (2011): 898-916.

Benezeth et al., "Review and Evaluation of Commonly-Implemented Background Subtraction Algorithms", 2008.

Carsten, R., et al., "Grabcut: Interactive foreground extraction using iterated graph cuts", ACM Transactions on Graphics (TOG) 23.3 (2004), pp. 309-314.

Crabb et al., "Real-Time Foreground Segmentation via Range and Color Imaging", 2008.

Gvili et al., "Depth Keying", 2003.

Kolmogorov, et al., "Bi-Layer Segmentation of Binocular Stereo Vision", IEEE, 2005.

Izquierdo' M. Ebroul. "Disparity/segmentation analysis: matching with an adaptive window and depth-driven segmentation." Circuits and Systems for Video Technology, IEEE Transactions on 9.4 (1999): 589-607.

Riccardi, M., "Background Subtraction Techniques: A Review", IEEE, 2004.

Wang, L., et al., "Tofcut: Towards robust real-time foreground extraction using a time-off camera.", Proc. of 3DPVT, 2010.

Xu, F., et al., "Human detection using depth and gray images", Advanced Video and Signal Based Surveillance, 2003., Proceedings, IEEE Conference on IEEE, 2003.

Zhang, Q., et al., "Segmentation and tracking multiple objects under occlusion from multiview video.", Image Processing, IEEE Transactions on 20.11 (2011), pp. 3308-3313.

Kitagawa et al., "Background Separation Encoding for Surveillance Purpose by using Stable Foreground Separation", APSIPA, Oct. 4-7, 2009, pp. 849-852.

Lee, D.S., "Effective Gaussian Mixture for Video Background Subtraction", IEEE, vol. 27, No. 5, dated May 2005, pp. 827-832.

Akbarzadeh, A., et al., "Towards Urban 3D Reconstruction From Video," Third International Symposium on 3D Data Processing, Visualization, and Transmission, pp. 1-8 (Jun. 14-16, 2006).

Barnat, Jii'f, et al., "CUDA accelerated LTL Model Checking," FI MU Report Series, FIMU-RS-2009-05, 20 pages (Jun. 2009).

Canesta™, "See How Canesta's Solution Gesture Control Will Change the Living Room," retrieved Oct. 21, 2010, from http://canesta.com, 2 pages.

Chan, S.C., et al., "Image-Based Rendering and Synthesis," IEEE Signal Processing Magazine, pp. 22-31 (Nov. 2007).

Chan, Shing-Chow, et al. "The Plenoptic Video," 15(12) IEEE Transactions on Circuits and Systems for Video Technology 1650-1659 (Dec. 2005).

Chen, Wan-Yu, et al., "Efficient Depth Image Based Rendering with Edge Dependent Depth Filter and Interpolation," IEEE International Conference on Multimedia and Expo, pp. 1314-1317 (Jul. 6, 2005).

Debevec, Paul, et al., "Efficient View-Dependent Image-Based Rendering with Projective Texture-Mapping," In 9th Eurographics Workshop on Rendering, pp. 105-116 (Jun. 1998).

(56) References Cited

OTHER PUBLICATIONS

Fehn, Christoph, et al., "Interactive 3-DTV—Concepts and Key Technologies," 94(3) Proceedings of the IEEE 524-538 (Mar. 2006).
GPGPU (General-purpose computing on graphics processing units)—Wikipedia, retrieved Nov. 17, 2009, from http://en.wikipedia.org/wiki/GPGPU, 9 pages.
Ho, Yo-Sung, et al., "Three-dimensional Video Generation for Realistic Broadcasting Services," ITC-CSCC, pp. TR-1 through TR4 (2008).
Jung, Kwang Hee, et al., "Depth Image Based Rendering for 3D Data Service Over T-DMB," IEEE, 3DTV-CON'08, Istanbul, Turkey, pp. 237-240 (May 28-30, 2008).
Kanade, Takeo, et al., "1/irtualized Reality: Constructing Virtual Worlds from Real Scenes," IEEE MultiMedia, pp. 34-46 (Jan.-Mar. 1997).
Kao, Wen-Chung, et al., "Multistage Bilateral Noise Filtering and Edge Detection for Color Image Enhancement," 51(4) IEEE Transactions on Consumer Electronics 1346-1351 (Nov. 2005).
Kipfer, Peter, "GPU Gems 3—Chapter 33. LCP Algorithms for Collision Detection Using CUDA," retrieved Nov. 17, 2009, from http://http.developernvidia.com/ GPUGems3/qpuqems3 ch33.html, 11 pages (2007).
Kubota, Akira, et al., "Multiview Imaging and 3DTV," IEEE Signal Processing Magazine, pp. 10-21 (Nov. 2007).
Lee, Eun-Kyung, et al., "High-Resolution Depth Map Generation by Applying Stereo Matching Based on Initial Depth Information," 3DTV-CON'08, Istanbul, Turkey, pp. 201-204 (May 28-30, 2008).
Mark, William R., et al., "Post-Rendering 3D Warping," In Proceedings of 1997 Symposium on Interactive 3D Graphics, Providence, RI, pp. 7-16 (Apr. 27-30, 1997).
McMillan, Jr., Leonard, "An Image-Based Approach to Three-Dimensional Computer Graphics," University of North Carolina at Chapel Hill, Chapel Hill, NC, 206 pages (1997).
Nguyen, Ha T., et al., "Image-Based Rendering with Depth Information Using the Propagation Algorithm," Proc. of IEEE International Conference on Acoustics, Speech, and Signal Processing (ICASSP), 4 pages (Mar. 2005).
Nguyen, Quang H., et al., "Depth image-based rendering from multiple cameras with 3D propagation algorithm," Proceedings of the 2nd International Conference on Immersive Telecommunications, 6 pages (2009).
Nguyen, Quang H., et al., "Depth Image-Based Rendering with Low Resolution Depth," 16th IEEE International conference on Image Processing (ICIP), pp. 553-556 (2009).
PrimeSense, Home Page, retrieved Oct. 21, 2010, from http://www.primesense.com, 1 page.
Saxena, Ashutosh, et al., "3-D Depth Reconstruction from a Single Still Image," 76(1) International Journal of computer Vision 53-69 (2007).
Shade, Jonathan, et al., "Layered Depth Images," Computer Graphics Proceedings, Annual Conference Series, pp. 231-242 (Jul. 19-24, 1998).
Tomasi, C., et al., "Bilateral Filtering for Gray and Color Images," Sixth International Conference on Computer Vision, pp. 839-846 (1998).
Vazquez, C., et al., "3D-TV: Coding of Disocclusions for 2D+Depth Representation of Multi-View Images," Proceedings of the Tenth IASTED Int'l Conference: Computer Graphics and Imaging, pp. 26-33 (Feb. 13-15, 2008).
Yang, Qingxiong, et al., "Spatial-Depth Super Resolution for Range Images," IEEE Conference on Computer Vision and Pattern Recognition, pp. 1-8 (2007).
Zhang, Buyue, et al., "Adaptive Bilateral Filter for Sharpness Enhancement and Noise Removal," IEEE ICIP, pp. IV-417-IV-420 (2007).
H. Y. Shum and S. B. Kang, "A Review of Image-based Rendering Techniques," Proc. IEEE/SPIE Visual Communications and Image (VCIP) 2000, pp. 2-13, Perth, Jun. 2000.
Working screenshot of Snagit manufactured by Techsmith, released Apr. 18, 2014.
Um, Gi-Mun, et al., "Three-dimensional Scene Reconstruction Using Multi-View Images and Depth Camera", pp. 271-280, SPIE-IS&t, vol. 5664, 2005.
Zitnick, C. Lawrence, et al., "High-quality video view interpolation using a layered representation," 23(3) Journal ACM Transactions on Graphics (TOG)—Proceedings of ACM SIGGRAPH 2004, pp. 600-608 (Aug. 2004).
Cheung et al., "Robust Techniques for Background Subtraction in Urban Traflice Video", 2004.
Yacoob, Y., et al., "Detection, analysis and matching of hair," in Computer Vision, 2005, ICCV 2005. Tenth IEEE International Conference, vol. 1., No., pp. 741-748, vol. 1, Oct. 17-21, 2005.
Talukder, a., et al., "Real-time detection of moving objects in a dynamic scene from moving robotic vehicles," in Intelligent Robots and Systems, 2003. (IROS 2003). Proceedings. 2003 IEEE/RSJ international Conference on, vol. 2, pp. 1308-1313, vol. 2, Oct. 27-31, 2003.
Sheasby, G., et al., "A robust stereo prior for human segmentation", In ACCV, 2012.
Hradis, M., et al., "Real-time Tracking of Participants in Meeting Video", Proceedings of CESCG, Wien, 2006.

\* cited by examiner

METHODS AND SYSTEMS FOR ASSIGNING PIXELS DISTANCE-COST VALUES USING A FLOOD FILL TECHNIQUE

CROSS-REFERENCE TO RELATED APPLICATIONS

This application is a continuation of U.S. application Ser. No. 14/716,495, filed May 19, 2015 and entitled "Methods and Systems for Assigning Pixels Distance-Cost Values Using a Flood Fill Technique," which is hereby incorporated herein by reference in its entirety.

BACKGROUND

Online data communications are quite prevalent and pervasive in modern society, and are becoming more so all the time. Moreover, developments in software, communication protocols, and peripheral devices (e.g., video cameras, three-dimension video cameras, and the like), along with developments in other computing disciplines, have collectively enabled and facilitated the inclusion of multimedia experiences as part of such communications. Indeed, the multimedia nature and aspects of a given communication session are often the focus and even essence of such communications. These multimedia experiences take forms such as audio chats, video chats (that are usually also audio chats), online meetings (e.g., web meetings), and of course many other examples could be listed as well.

Using the context of online meetings as an illustrative example, it is often the case that one of the participants in the video conference call is a designated presenter, and often this user opts to embed a digital representation of themselves (i.e., a persona) as part of the offered presentation. By way of example, the user may choose to have a video feed embedded into a power point presentation. In a simple scenario, the video feed may include a depiction of the user as well as background information. The background information may include a view of the wall behind the user as seen from the point of view of the video camera. If the user is outside, the background information may include buildings and trees. In more advanced versions of this video conferencing paradigm, the persona is isolated from the background information found in video feed. This allows viewers to experience a more natural sensation as the embedded persona they see within the presentation is not cluttered and surrounded by distracting and undesired background information.

Overview

Improvements over the above-described developments have recently been realized by technology that, among other capabilities and features, extracts what is known as a "persona" of a user from a video feed from a video camera that is capturing video of the user. The extracted persona, which in some examples appears as a depiction of part of the user (i.e., upper torso, shoulders, arms, hands, neck, and head) and in other examples appears as a depiction of the entire user. This technology is described in the following patent documents, each of which is incorporated in its respective entirety into this disclosure: (i) U.S. patent application Ser. No. 13/083,470, entitled "Systems and Methods for Accurate User Foreground Video Extraction," filed Apr. 8, 2011 and issued Aug. 26, 2014 as U.S. Pat. No. 8,818,028, (ii) U.S. patent application Ser. No. 13/076,264, entitled "Systems and Methods for Embedding a Foreground Video into a Background Feed based on a Control Input," filed Mar. 30, 2011 and published Oct. 6, 2011 as U.S. Patent Application Pub. No. US2011/0242277, and (iii) U.S. patent application Ser. No. 14/145,874, entitled "System and Methods for Persona Identification Using Combined Probability Maps," filed Dec. 31, 2013 and issued Aug. 9, 2016 as U.S. Pat. No. 9,414,016.

Facilitating accurate and precise extraction of the persona, especially the hair of the persona, from a video feed is not a trivial matter. At least one aspect of some user extraction processes includes classifying pixels as foreground of the video data. In some processes classification pixels as background is performed. As mentioned, persona extraction is carried out with respect to video data that is received from a camera that is capturing video of a scene in which the user is positioned. The persona-extraction technology substantially continuously (e.g., with respect to each frame) identifies which pixels represent the user (i.e., the foreground) and which pixels do not (i.e., the background), and accordingly generates "alpha masks" (e.g., generates an alpha mask for each frame), where a given alpha mask may take the form of or at least include an array with a respective stored data element corresponding to each pixel in the corresponding frame, where such stored data elements are individually and respectively set equal to 1 (one) for each user pixel (a.k.a. for each foreground pixel) and to 0 (zero) for every other pixel (i.e., for each non-user (a.k.a. background) pixel).

The described alpha masks correspond in name with the definition of the "A" in the "RGBA" pixel-data format known to those of skill in the art, where "R" is a red-color value, "G" is a green-color value, "B" is a blue-color value, and "A" is an alpha value ranging from 0 (complete transparency) to 1 (complete opacity). In a typical implementation, the "0" in the previous sentence may take the form of a hexadecimal number such as 0x00 (equal to a decimal value of 0 (zero)), while the "1" may take the form of a hexadecimal number such as 0xFF (equal to a decimal value of 255); that is, a given alpha value may be expressed as an 8-bit number that can be set equal to any integer that is (i) greater than or equal to zero and (ii) less than or equal to 255. Moreover, a typical RGBA implementation provides for such an 8-bit alpha number for each of what are known as the red channel, the green channel, and the blue channel; as such, each pixel has (i) a red ("R") color value whose corresponding transparency value can be set to any integer value between 0x00 and 0xFF, (ii) a green ("G") color value whose corresponding transparency value can be set to any integer value between 0x00 and 0xFF, and (iii) a blue ("B") color value whose corresponding transparency value can be set to any integer value between 0x00 and 0xFF. And certainly other pixel-data formats could be used, as deemed suitable by those having skill in the relevant art for a given implementation.

When merging an extracted persona with content, the above-referenced persona-based technology creates the above-mentioned merged display in a manner consistent with these conventions; in particular, on a pixel-by-pixel (i.e., pixel-wise) basis, the merging is carried out using pixels from the captured video frame for which the corresponding alpha-mask values equal 1, and otherwise using pixels from the content. Moreover, it is noted that pixel data structures typically also include or are otherwise associated with one or more other values corresponding respectively to one or more other properties of the pixel, where brightness is an example of one such property. In some embodiments, the brightness value is the luma component of the image or video frame. In other embodiments, the brightness value is the pixel values of one of an R, G, or B color channel, or other similar color space (e.g., gamma compressed RGB, or R'G'B', or YUV, or YCbCr, as examples). In other embodiments, the brightness value may be a weighted average of pixel values from one or more color channels. And other approaches exist as well.

This disclosure describes systems and methods for assigning pixels distance-cost values using a flood fill technique. Such systems and methods are useful for, among other things, scenarios in which a user's persona is to be extracted from a video feed, for example, in an online "panel discussion" or more generally an online meeting or other online communication session. The present systems and methods facilitate natural interaction by providing the accurate and precise identification of the user's hair, a particularly troublesome aspect of a comprehensive user extraction process. The present systems and methods therefore provide an advanced approach for assigning pixels distance-cost values using a flood fill technique, which may in turn be used to classify pixels as foreground or background in the context of a persona extraction process. Such a classification may take the form of a hard (e.g., binary) classification or a soft (e.g., probabilistic) classification.

One embodiment of the systems and methods disclosed herein takes the form of a process. The process includes obtaining video data depicting a head of a user. The process also includes obtaining depth data associated with the video data. The process also includes selecting seed pixels for a flood fill at least in part by using the depth information. The process also includes performing the flood fill from the selected seed pixels. The flood fill assigns respective distance-cost values to pixels of the video data based on position-space cost values and color-space cost values.

Another embodiment takes the form of a system that includes a communication interface, a processor, and data storage containing instructions executable by the processor for causing the system to carry out at least the functions described in the preceding paragraph.

Moreover, any of the variations and permutations described in the ensuing paragraphs and anywhere else in this disclosure can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and or characterize such embodiments.

In at least one embodiment, obtaining the video data includes obtaining the video data using a video camera. The video camera may be a three-dimension (3-D) video camera that captures the video data as well as the depth data associated with the video data. In such an embodiment, obtaining depth data associated with the video data includes obtaining the depth data via the 3-D video camera. In another embodiment, obtaining the video data includes obtaining the video data via a data store.

In at least one embodiment, obtaining depth data associated with the video data includes obtaining depth data associated with the video data using one or more of a depth sensor, a depth camera, a 3-D video camera, and a light field camera. In embodiments wherein a light field camera is employed, both the video data and the depth data are obtained via the light field camera. In another embodiment, obtaining depth data includes obtaining depth data via a data store.

Obtaining the video data and obtaining the depth data may include obtaining the video data from a first camera and obtaining the depth data from a second camera. Obtaining the video data and obtaining the depth data may include obtaining the video data from a first camera and obtaining the depth data from the first camera as well. Obtaining the video data and obtaining the depth data may include obtaining the video data from a first set of cameras and obtaining the depth data from a second set of cameras. Obtaining the video data and obtaining the depth data may include obtaining the video data from a first set of cameras and obtaining the depth data from the first set of cameras. Obtaining the video data and obtaining the depth data may include obtaining the video data from a first set of cameras and obtaining the depth data from a subset of the first set of cameras. Obtaining the video data and obtaining the depth data may include obtaining the depth data from a first set of cameras and obtaining the video data from a subset of the first set of cameras.

In at least one embodiment, selecting seed pixels for the flood fill further includes selecting seed pixels for the flood fill at least in part by using the video data.

In at least one embodiment, selecting seed pixels for the flood fill includes (i) obtaining an upper contour of a head of the user, and (ii) selecting pixels on the obtained upper contour as seed pixels for the flood fill. Such an embodiment is referred to in the balance of this disclosure as an upper contour embodiment.

In at least one upper contour embodiment, obtaining the upper contour of the head of the user includes generating the upper contour of the head of the user based at least in part on the depth data associated with the video data. In at least one such embodiment, generating the upper contour of the head of the user based at least in part on a threshold depth value.

In at least one upper contour embodiment, obtaining the upper contour of the head of the user comprises (i) obtaining a head contour that estimates an outline of the head of the user, and (ii) identifying an upper portion of the obtained head contour as being the upper contour of the head of the user. The head contour may be obtained at least in part using depth data associated with the video data. As another example, the head contour may be obtained via facial recognition techniques which are well known by those with skill in the relevant art.

In some upper contour embodiments, the selected seed pixels are equally distributed along the upper contour. In other upper contour embodiments, the selected seed pixels are not equally distributed along the upper contour. In at least one upper contour embodiment, the selected seed pixels include every pixel on the upper contour. In at least one upper contour embodiment, the selected seed pixels do not include every pixel on the upper contour.

In at least one upper contour embodiment, the selected seed pixels are of colors that are found in a user-hair-color model. In at least one further upper contour embodiment, the selected seed pixels are of colors that are found in the user-hair color model at least a threshold number of times. In some embodiments, the selected seed pixels are of colors that are above a threshold level of certainty of being a user-hair color according to a user-hair-color model.

In at least one upper contour embodiment, the selected seed pixels are of colors that are not found in a background-color model. In at least one further upper contour embodiment, the selected seed pixels are of colors that are found in the background-color model less than a threshold number of times. In some embodiment, the selected seed pixels are of colors that are below a threshold level of certainty of being a background color according to a background-color model.

In at least one embodiment, selecting seed pixels for the flood fill includes (i) identifying noisy depth-pixels within the obtained depth data, and (ii) selecting the identified noisy depth-pixels as seed pixels for the flood fill. The noisy depth-pixels have intermittent depth values. Such an embodiment is referred to in the balance of this disclosure as a noisy depth-pixel embodiment.

In at least one noisy depth-pixel embodiment, the selected seed pixels are located within an extended head box.

In at least one noisy depth-pixel embodiment, the selected seed pixels have intermittent depth values similar to a depth value corresponding to the head of the user (i.e., the selected seed pixels have intermittent depth values that are within a threshold tolerance of a depth value corresponding to the head of the user).

In at least one noisy depth-pixel embodiment, the selected seed pixels are of colors that are found in a user-hair-color model. In at least one noisy depth-pixel embodiment, the selected seed pixels are not of colors that are found in a background-color model.

In at least one noisy depth-pixel embodiment, the selected seed pixels are of colors that are found a user-hair color model at least a threshold number of times. In at least one noisy depth-pixel embodiment, the selected seed pixels are of colors that are not found a background-hair color model more than a threshold number of times.

In some noisy depth-pixel embodiments, the selected seed pixels are of colors that are above a threshold level of certainty of being a user-hair color according to a user-hair-color model. In some noisy depth-pixel embodiment, the selected seed pixels are of colors that are below a threshold level of certainty of being a background color according to a background-color model.

In at least one embodiment, the process further includes initializing the distance-cost values of the seed pixels to be zero.

In at least one embodiment, a first set of the selected seed pixels are on an upper contour and a second set of the selected seed pixels have intermittent depth values. In at least one such embodiment, the process further includes initializing the distance-cost values of the seed pixels in the first set to be zero and initializing the distance-cost values of the seed pixels in the second set to be non-zero.

In at least one embodiment, the distance-cost value of a given pixel includes (i) a position-space cost value from a seed pixel to the given pixel and (ii) a color-space cost value from the seed pixel to the given pixel.

In at least one embodiment, the distance-cost value of a given pixel is a geodesic-distance-cost value from a seed pixel to the given pixel. The geodesic-distance-cost value is a combination of a position-space cost value from the seed pixel to the given pixel and (ii) a color-space cost value from the seed pixel to the given pixel.

In at least one embodiment, the distance-cost value of a given pixel includes (i) a position-space cost value from a seed pixel to the given pixel and (ii) a summation of color-space step-cost values along a flood fill path from the seed pixel to the given pixel.

In at least one embodiment, the distance-cost value of a given pixel includes (i) a position-space cost value from a seed pixel to the given pixel and (ii) a color-space cost value that is based at least in part on a user-hair color model and a color of the given pixel.

In at least one embodiment, performing the flood fill includes (i) identifying a plurality of neighbor pixels of a current pixel, (ii) determining respective step-cost values from the current pixel to each pixel in the plurality of neighbor pixels, and (iii) assigning each pixel in the plurality of neighbor pixels a respective distance-cost value based on a distance-cost value of the current pixel and the respective step-cost values.

In at least one embodiment, performing the flood fill includes (i) determining a minimum distance-cost value from at least one of the selected seed pixels to a current pixel and (ii) assigning the current pixel a distance-cost value that is the determined minimum distance-cost value.

In at least one embodiment, determining a minimum distance-cost value includes comparing a current distance-cost value corresponding with a current flood fill path to a prior distance-cost value corresponding with a prior flood fill path.

In at least one such embodiment, the current flood fill path and the prior flood fill path originate from a common seed pixel. In at least one other such embodiment, the current flood fill path and the prior flood fill path originate from different seed pixels.

In at least one embodiment, performing the flood fill comprises performing the flood fill along a plurality of flood-fill paths. In at least one such embodiment the process further includes terminating the flood fill along a current flood-fill path in response to at least one termination criteria. The termination criteria includes a current pixel not being a user-hair color according to a user-hair-color model, the current pixel being a background color according to a background-color model, a distance-cost value of the current pixel being greater than a distance-cost threshold, and a step-cost value of the current pixel being greater than a step-cost threshold. Of course many other termination criteria could be employed as well such as a position-space-cost value of the current pixel being greater than a position-space-cost threshold and a color-space-cost value of the current pixel being greater than a color-space-cost threshold.

In at least one embodiment, the process further includes classifying pixels of the video data as foreground based at least in part on the assigned distance-cost values. In at least one embodiment, the process further includes classifying pixels of the video data as background based at least in part on the assigned distance-cost values. In at least one embodiment, the process further includes assigning pixels of the video data foreground-likelihood values based at least in part on the assigned distance-cost values. In at least one embodiment, the process further includes assigning pixels of the video data background-likelihood values based at least in part on the assigned distance-cost values.

At a high level, the systems and processes described herein use video data and novel processing techniques to assign distance-cost values to pixels of the video data. The assigned distance-cost values may be used to classify pixels of the video data as foreground. The video data depicts a head of a user. The user may or may not have hair on the top of their head. The systems and processes described herein may be used to identify the hair of the user and in turn classify the hair of the user as foreground. The identified hair may in turn be used as part of a comprehensive user extraction (foreground identification) process. Part of identifying the hair of the user involves performing a flood fill to assign distance-cost values to pixels of the video data.

Depending on the nature of the obtained video data and the obtained depth data, pixels may take on a plurality of forms.

In scenarios wherein a single frame of information includes both video data and depth data, pixels in such a frame include both color information and depth information. In such a scenario the term depth pixel references the depth information of a pixel and the terms pixel of video data, color pixel, and the like reference the color information of the pixel. In such a scenario the term pixel may be used to reference either or both the color information and the depth information. Of course, any pixel has an associated location and even when not explicated stated this would be well known by those with skill in the art.

In scenarios wherein there are separate frames of video data and depth data there is a correspondence between the frames of video data and the frames of depth data. Therefore, if a depth pixel is identified within a frame of depth data it is evident that a corresponding pixel of video data may be included within that identification and vice versa.

Seed pixels, along with video data, are inputs to a flood fill process. The flood fill process assigns pixels of video data distance-cost values. A distance-cost value is a value that grows larger as the likelihood that a pixel is part of the user's hair decreases. The distance-cost value of a given pixel is based on a position-space cost value associated with a seed pixel and the given pixel and a color-space cost value associated with either the seed pixel, previous-step pixel, or a user-hair-color model and the given pixel. A hair-likelihood (or foreground-likelihood) may be based on an assigned distance-cost value of the given pixel.

A user-hair-color model and a background-color model may each take on a plurality of forms. In general each model is used to indicate which colors are representative of a user-hair color and a background of the video data respectively. The models may take on the form of a histogram, a Gaussian mixture, an array of color values and respective color counts, and the like.

The flood fill process may be a recursive process. In one embodiment, at each pixel, the flood fill will identify a set of nearby pixels and assign to each of them respective distance-cost values. Then this same method will be done with respect to each of those nearby pixels. This will happen many times, until assigned distance-cost values (or certain parts of assigned distance-cost values) reach a threshold or until other flood fill termination criteria are met. Of course, as this may be implemented as a massively parallel process, pixels will be visited more than once as a result of the use of various different flood fill paths (i.e., series of steps to different nearby pixels).

In general, any indication, classification, assignment, and the like of pixels, regions, portions, and the like of the video data is relevant within the scope of the systems and processes described herein. As this disclosure describes systems and processes that may be used as part of a comprehensive user-extraction process, it is explicitly noted that it is not required that any classification of pixels as foreground or background be definitive with respect to the entire user-extraction process.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
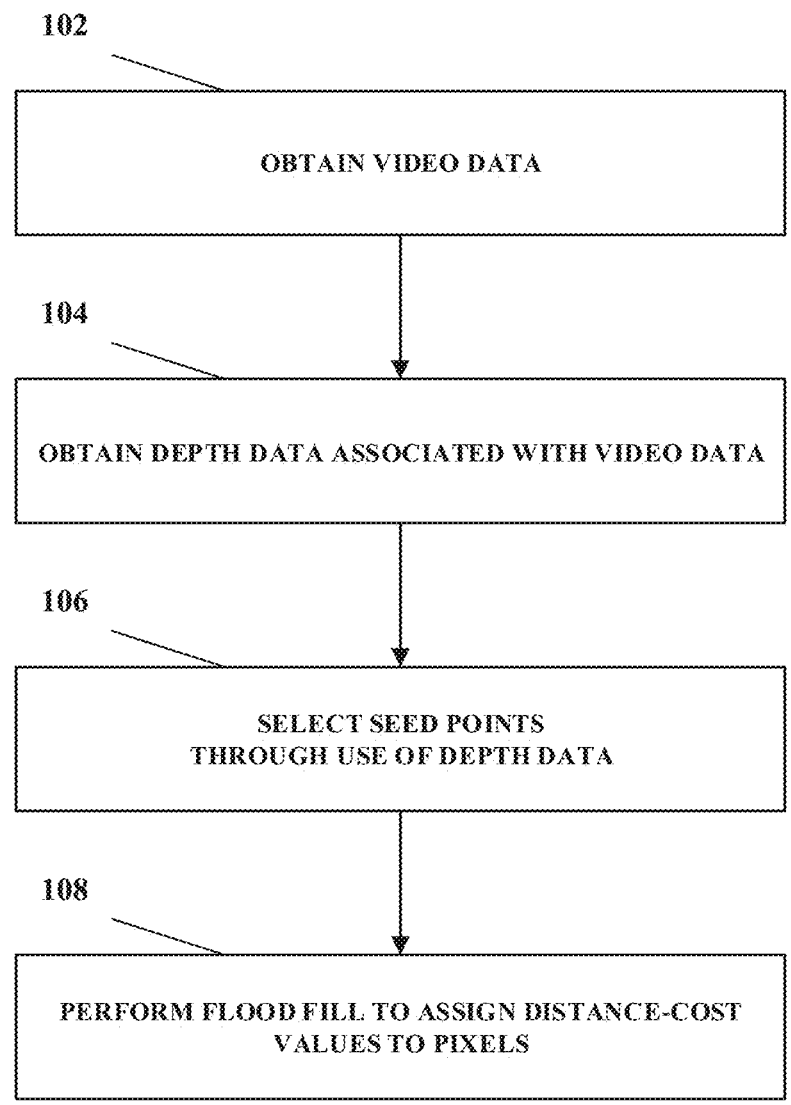
FIG. 1 depicts an example process, in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . ." And it is for reasons akin to brevity and clarity of presentation that this implied leading clause is not repeated ad nauseum in this detailed description.

FIG. 1 depicts an example process, in accordance with at least one embodiment. In particular, FIG. 1 depicts an example process 100 that includes elements 102-108.

Although primarily depicted and described as being performed serially, at least a portion of the elements (steps) of the process 100 may be performed contemporaneously, or in a different order than is depicted in and described in connection with FIG. 1. Furthermore, in at least one embodiment, the process 100 is repeated, at some point in time, after any of the elements 102-108 are completed. Additionally, repetition of the process 100 may or may not include performance of each element in the process 100, and may commence at any of the elements 102-108. The process 100 is further described below.

One embodiment takes the form of the process 100. The process 100 includes obtaining video data depicting a head of a user. The process 100 also includes obtaining depth data associated with the video data. The process 100 also includes selecting seed pixels for a flood fill at least in part by using the depth data. The process 100 also includes performing the flood fill from the selected seed pixels. The flood fill assigns respective distance-cost values to pixels of the video data based on position-space cost values and color-space cost values.

At element 102 the process 100 includes obtaining video data depicting a head of a user.

At element 104 the process 100 includes obtaining depth data associated with the obtained video data.

At element 106 the process 100 includes using at least the obtained depth data to select seed points for a flood fill.

At element 108 the process 100 includes assigning pixels of the obtained video data respective distance-cost values through performance of the flood fill that takes as input the selected seed points. The respective distance-cost values are based at least in part on respective position-space cost values and respective color-space cost values.

In at least one embodiment, the process 100 further includes classifying pixels of the video data as foreground based at least in part on the assigned distance-cost values. In at least one embodiment, the process 100 further includes classifying pixels of the video data as background based at least in part on the assigned distance-cost values. In at least one embodiment, the process 100 further includes assigning pixels of the video data foreground-likelihood values based at least in part on the assigned distance-cost values. In at least one embodiment, the process 100 further includes assigning pixels of the video data background-likelihood values based at least in part on the assigned distance-cost values.

Figure 2:
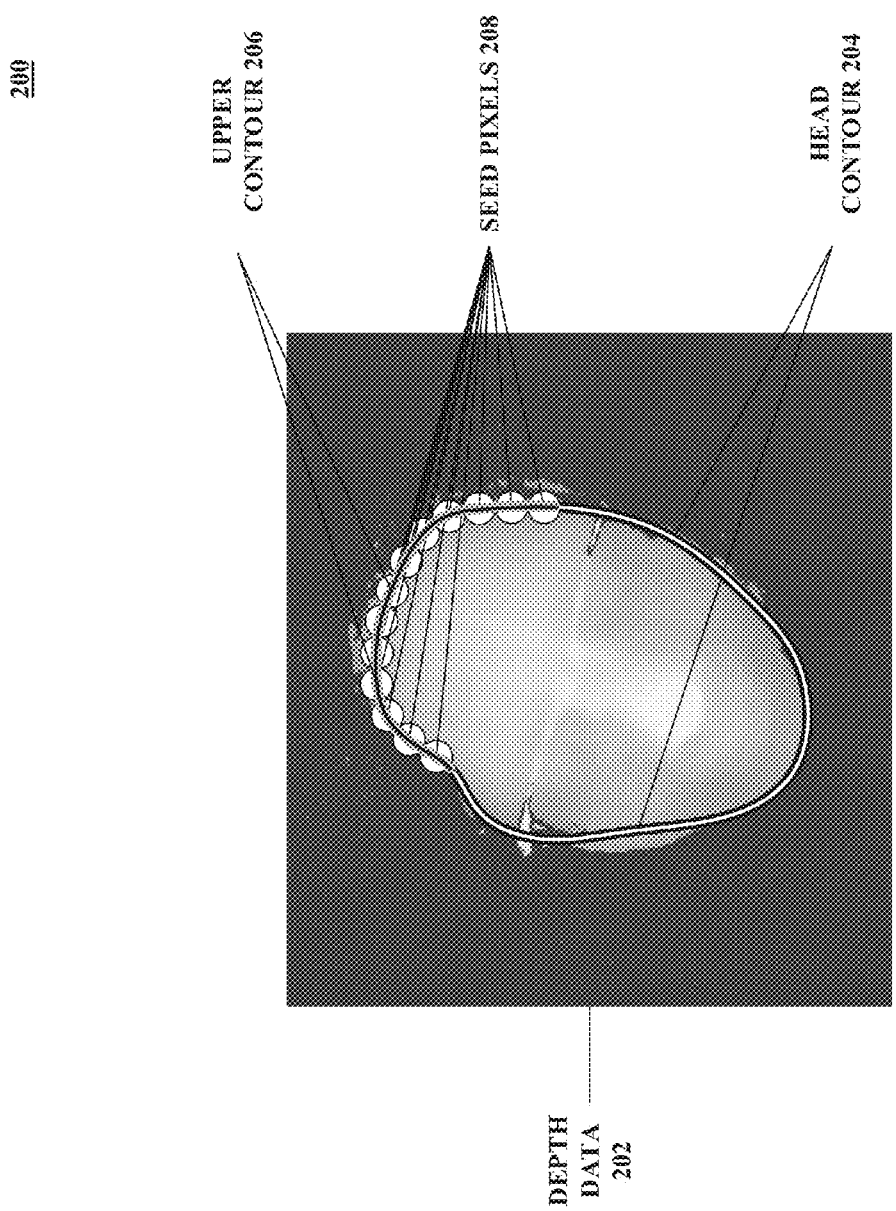
FIG. 2 depicts seed pixels on an upper contour, in accordance with an embodiment.

FIG. 2 depicts seed pixels on an upper contour, in accordance with an embodiment. In particular, FIG. 2 depicts a graphical overview 200 that includes depth data 202, a head contour 204, an upper contour 206, and seed pixels 208. The depth data 202 may represent a first frame of depth information. The depth data 202 may be generated via a depth camera, 3-D camera, or the like and may be obtained via a communication interface. The depth data 202 may alternatively be obtained via a data store. The depth data 202 may correspond with one or more frames of video data. A mapping of depth-pixels to color-pixels within the frames may be included. Alternatively, each pixel in a frame of obtained video data may include color and depth information inherently as described previously in the Overview. It follows that a frame of 3-D data may either correspond with a single array of pixels, wherein each pixel includes both depth and color information or two arrays of pixels, wherein each pixel in the first array includes depth information and each pixel in the second array includes color information.

Described generally, in at least one embodiment, selecting the seed pixels 208 for the flood fill includes (i) obtaining the upper contour 206 of the head of the user, and (ii) selecting pixels on the obtained upper contour 206 as the seed pixels 208 for the flood fill. In at least one embodiment, the process further includes initializing the distance-cost values of the seed pixels to be zero. In at least one embodiment, obtaining the upper contour 206 of the head of the user includes generating the upper contour 206 of the head of the user based at least in part on the depth data 202 associated with the video data. In at least one such embodiment, generating the upper contour 206 of the head of the user is based at least in part on a threshold depth value. A further description of one example of this embodiment is discussed in relation with FIG. 3.

In at least one embodiment, obtaining the upper contour of the head of the user comprises (i) obtaining the head contour 204 that estimates an outline of the head of the user, and (ii) identifying an upper portion of the obtained head contour as being the upper contour 206 of the head of the user. The head contour 204 may be obtained at least in part using depth data 202 associated with the video data. As another example, the head contour 204 may be obtained via facial recognition techniques which are well known by those with skill in the relevant art. A further description of one example of this step is discussed in relation with FIGS. 4&5.

In some embodiments, the selected seed pixels 208 are equally distributed along the upper contour 206. In other embodiments, the selected seed pixels 208 are not equally distributed along the upper contour 206. In at least one embodiment, the selected seed pixels 208 include every pixel on the upper contour 206 and in at least one other embodiment, the selected seed pixels 208 do not include every pixel on the upper contour 206.

Additionally, in some embodiments, selecting the seed pixels 208 for the flood fill further includes selecting the seed pixels 208 for the flood fill at least in part by using the obtained video data. In some embodiments, selecting the seed pixels 208 for the flood fill further includes selecting the seed pixels 208 for the flood fill at least in part by using color information. The color information may come in the form of a user-hair-color model. The user-hair-color model is a construct that estimates which color values (e.g., RGB color values) are part of the user's hair and how often each color value is depicted in the video data. When selecting the seed pixels 208 it is desirable that each seed pixel is a color that is found in the user's hair. In at least one embodiment, the selected seed pixels 208 are of colors that are found in a user-hair-color model. In at least one further embodiment, the selected seed pixels 208 are of colors are found the user-hair color model at least a threshold number of times. This further embodiment allows for statistically reliable results. It may be the case that a set of potential seed pixels is selected prior to selecting the seed pixels 208 and only those pixels in the set of potential seed pixels that have desirable color values (e.g., colors found in the user-hair-color model) are selected as the seed pixels 208.

Additionally, in some embodiments, the color information may come in the form of a background-color model. The background-color model is a construct that estimates which color values (e.g., RGB color values) are part of the background (normally the part of the background bordering the user's hair) and how often each color value is depicted in the video data. When selecting the seed pixels 208 it is sometimes desirable that each seed pixel is not a color that is found in the background. In at least one embodiment, the selected seed pixels 208 are of colors that are found in a background-color model. In at least one further embodiment, the selected seed pixels 208 are of colors are found the background-color model at least a threshold number of times. This further embodiment allows for statistically reliable results. It may be the case that a set of potential seed pixels is selected prior to selecting the seed pixels 208 and only those pixels in the set of potential seed pixels that have desirable color values (e.g., colors not found in the background-color model) are selected as the seed pixels 208.

Figure 3:
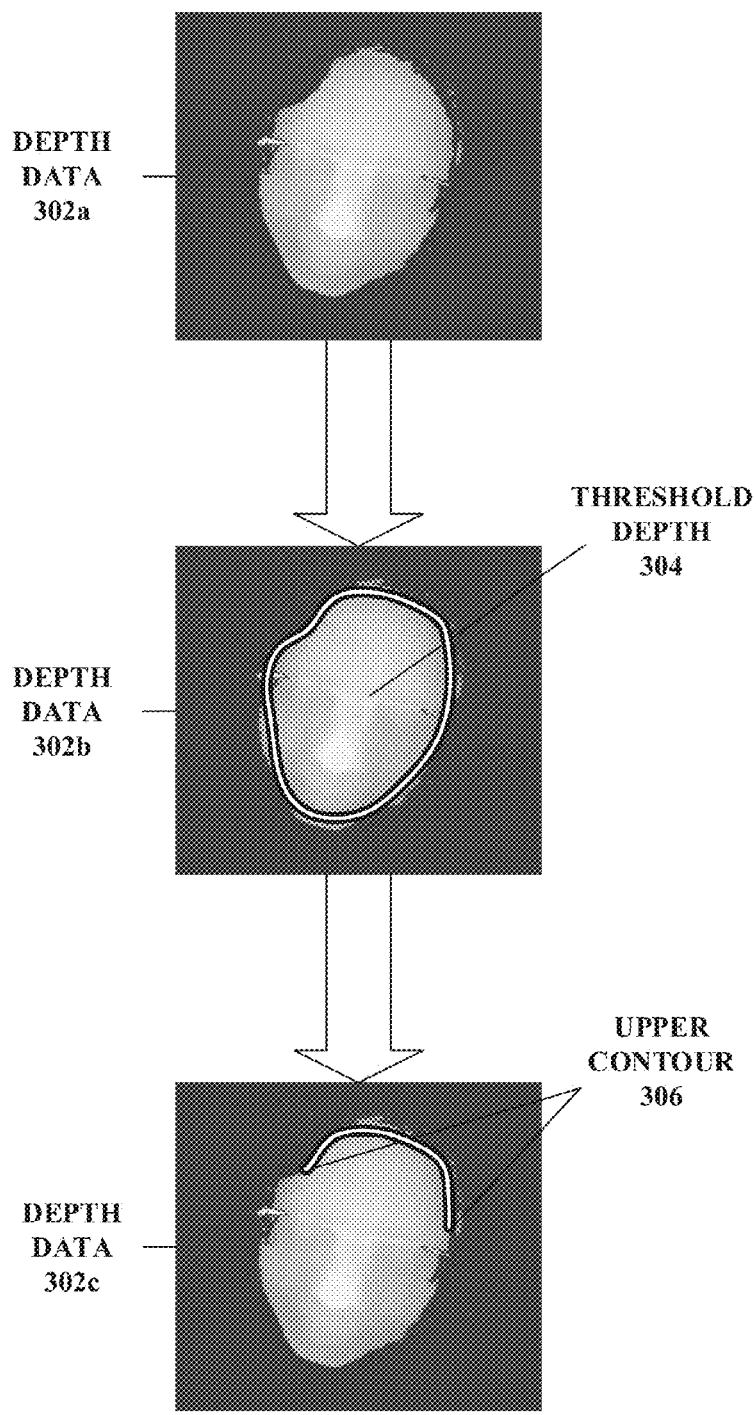
FIG. 3 depicts a generation of an upper contour using depth data, in accordance with an embodiment.

FIG. 3 depicts a generation of an upper contour using depth data, in accordance with an embodiment. In particular, FIG. 3 depicts a conceptual overview 300 that includes depth data 302a, depth data 302b with an identified region of threshold depth 304, and depth data 302c with an upper contour 306. The depth data 302a-c may represent a first frame of depth information. The depth data 302a-c may be generated via a depth camera, 3-D camera, or the like and obtained via a communication interface. The depth data 302a-c may alternatively be obtained via a data store. The depth data 302b and 302c depict the same depth information as the depth data 302a, but additionally show the threshold depth 304 and the upper contour 306 respectively. FIG. 3 may be used as an example of generating the upper contour 206 of FIG. 2 based at least in part on a threshold depth value. In such an example, the depth data 302a-c is equivalent to the depth data 202 of FIG. 2 and the upper contour 306 is equivalent to the upper contour 206 of FIG. 2.

In at least one embodiment, wherein generating the upper contour 306 is based at least in part on depth data (i.e., the depth data 302a or equivalently the depth data 302b and 302c) associated with the video data, generating the upper contour 306 is based at least in part on the threshold depth 304. The threshold depth 304 is employed to help identify a region of the depth data 302a-c (and therefore, a corresponding region in the associated video data) wherein the depth-pixels within the identified region have respective depth values that fall within the threshold depth 304.

As depicted in the conceptual overview 300, a region is identified, wherein the region corresponds with depth values that fall within the threshold depth 304. The threshold depth 304 may be a single value or a range of values. The threshold depth 304 may indicate a region of depth information that is greater than a particular depth value, less than a particular depth value, included within a range of depth values, or excluded from a range of depth values. For example, the threshold depth 304 could correspond to a region with depth values greater than 20 cm from a depth camera but less than 35 cm from the depth camera.

In some embodiments, the threshold depth 304 is a set value, or range of values, that is obtained via a data store. It is immutable and is hard-coded into the systems and processes described herein. In some other embodiments, the threshold depth 304 is generated through an analysis of the depth data 302a-c. For example, a sub-process can identify for a frame of depth information, two ranges of depth values that respectively correspond to a foreground region and a background region of the video data, and responsively define the threshold depth 304 to segment the two ranges.

Furthermore, a boundary of the threshold depth 304 may be used to define a head contour. A head contour estimates the outline of a head of a user. A head contour may be generated or obtained via other methods as well. The head contour may encompass the user's hair or may not encompass the user's hair, depending on the characteristics of the user's hair as well as the properties of the depth camera used to capture depth information 302a. Resultantly, the upper contour 306 may indicate a hair-background boundary or a forehead-hair boundary. It is assumed that the upper contour 306 takes on one of these two qualities and the systems and processes described herein teach a technique for identifying a hair-region of the user as foreground in view of this unknown variable.

In some cases, more than one region is identified, wherein the more than one regions each correspond with depth values that fall within the threshold depth 304. In order to define the head contour one of the more than one regions must be selected. In one embodiment, face detection is used to determine the selected region. In another embodiment, a head box is employed. A head box is a region of pixels that are known to be part of the head. Determining the selected region includes comparing a respective amount of area overlap between each the identified regions and the head box and determining the selected region to be whichever of the identified regions is associated with a greater amount of area overlap with the head box.

Figure 4:
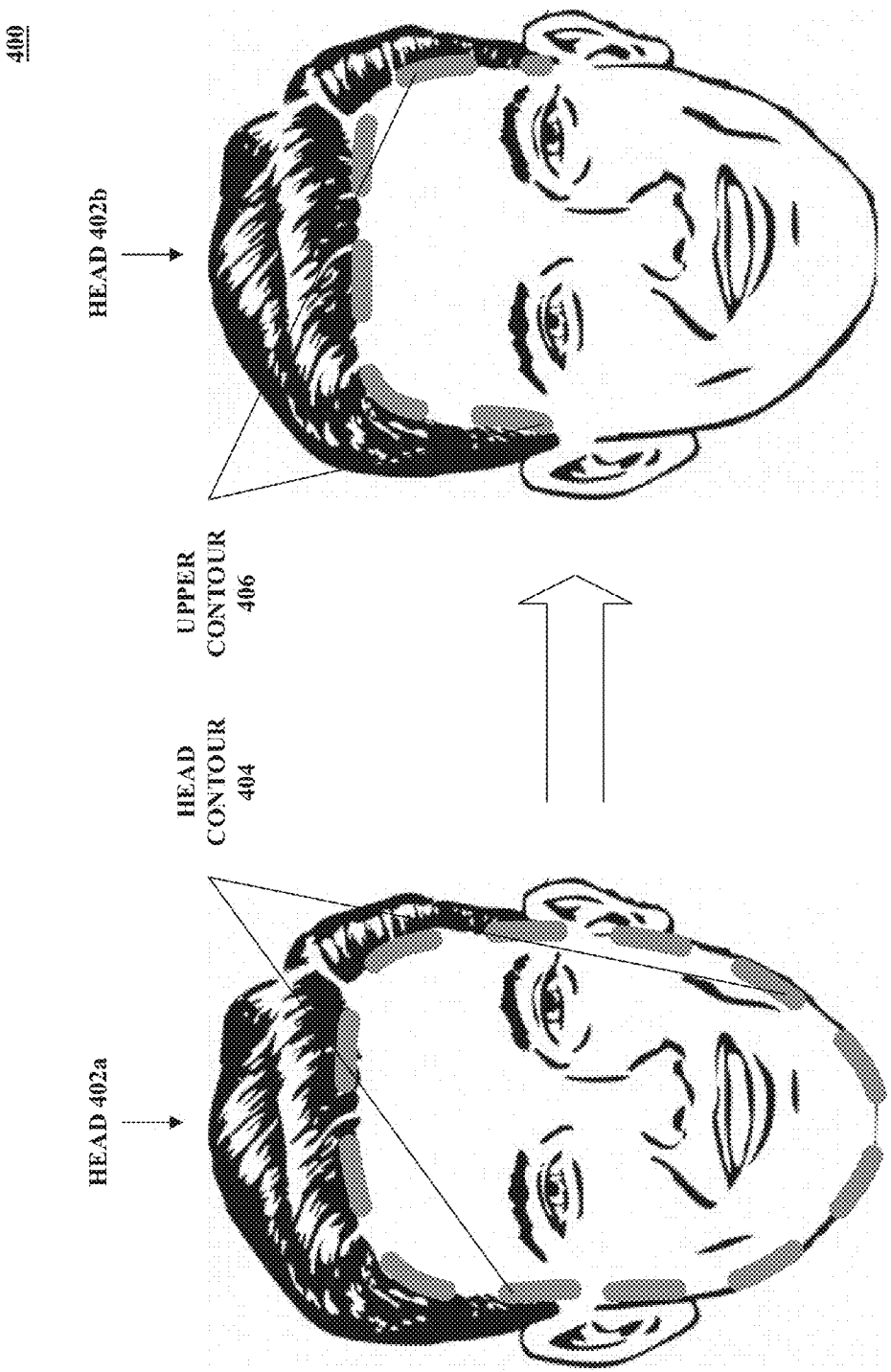
FIG. 4 depicts a first example generation of an upper contour using a head contour, in accordance with an embodiment.

FIG. 4 depicts a first example generation of an upper contour using a head contour, in accordance with an embodiment. In particular, FIG. 4 depicts a conceptual overview 400 that includes the head of the user, head 402a and head 402b. The head 402a-b may be found in a frame of video data and both the head 402a and the head 402b depict the same video data. The head 402a has a head contour 404 shown and the head 402b has an upper contour 406 shown.

In at least one embodiment, obtaining the upper contour 406 of the head 402a (or equivalently head 402b) of the user includes (i) obtaining a head contour 404 that estimates an outline of the head 402a (or equivalently head 402b) of the user, and (ii) identifying an upper portion of the obtained head contour 404 as being the upper contour 406 of the head 402a (or equivalently head 402b) of the user. The head contour 404 may be obtained at least in part using depth data associated with the video data, an example of which is described in connection with FIG. 3.

The head contour 404 outlines the user's face but does not include the user's hair, therefore the identified upper portion of the head contour 404 lies between the user's forehead and the user's hair. In turn, the upper contour 406, lies between the user's forehead and the user's hair.

Figure 5:
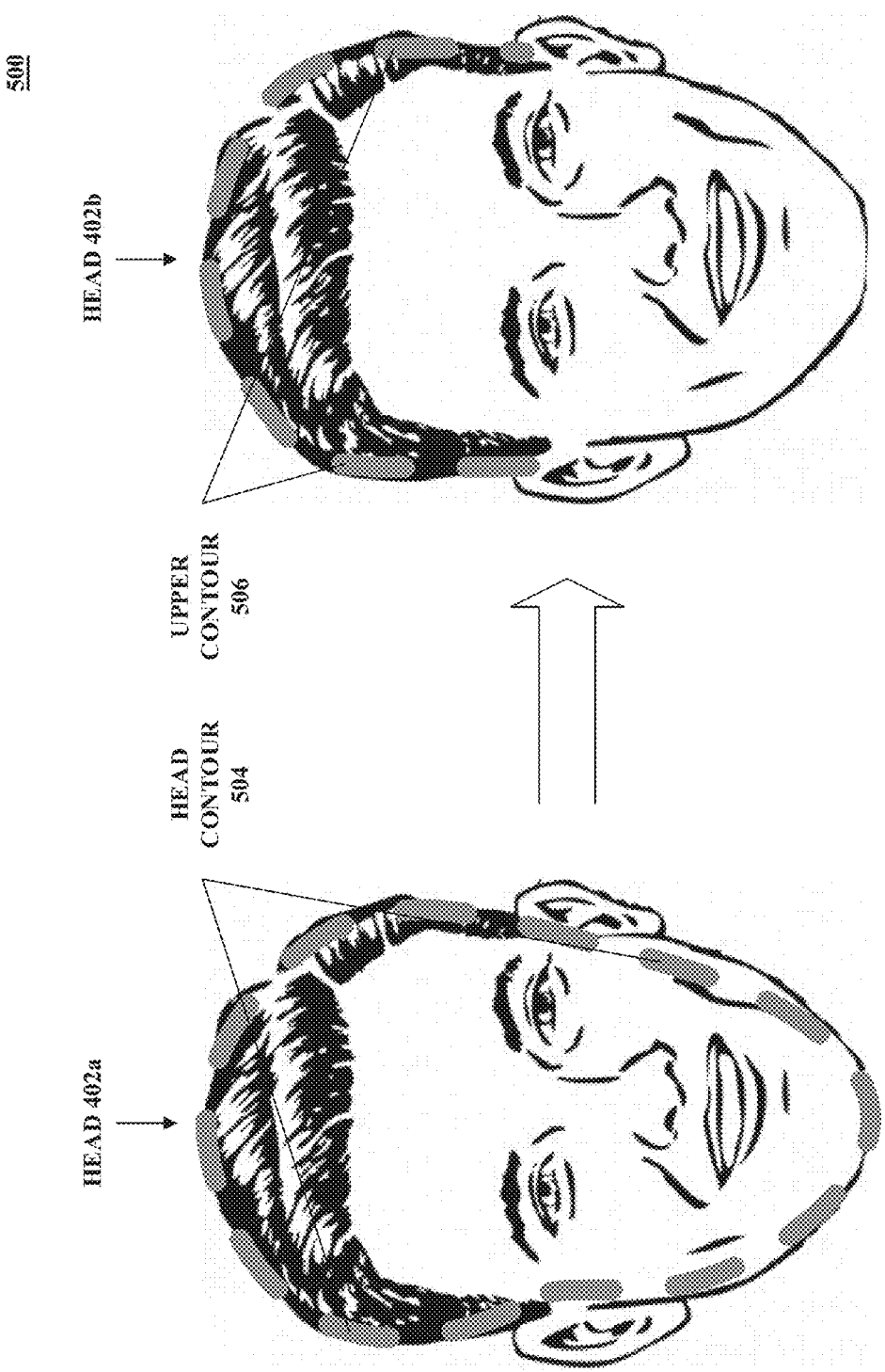
FIG. 5 depicts a second example generation of an upper contour using a head contour, in accordance with an embodiment.

FIG. 5 depicts a second example generation of an upper contour using a head contour, in accordance with an embodiment. In particular, FIG. 5 depicts a conceptual overview 500 that includes the head of the user, head 502a and head 502b. The head 502a-b may be found in a frame of video data and both the head 502a and the head 502b depict the same video data. The head 502a has a head contour 504 shown and the head 502b has an upper contour 506 shown.

In at least one embodiment, obtaining the upper contour 506 of the head 502a (or equivalently head 502b) of the user includes (i) obtaining a head contour 504 that estimates an outline of the head 502a (or equivalently head 502b) of the user, and (ii) identifying an upper portion of the obtained head contour 504 as being the upper contour 506 of the head 502a (or equivalently head 502b) of the user. The head contour 504 may be obtained at least in part using depth data associated with the video data, an example of which is described in connection with FIG. 3.

The head contour 504 outlines the user's head including the user's hair, therefore the identified upper portion of the head contour 504 lies between the user's hair and a background portion of the video data. In turn, the upper contour 506, lies between the user's hair and a background portion of the video data. The background portion may be determined using the depth data associated with the video data.

The previous portion of this detailed description, with respect to FIGS. 4 & 5, highlights two possible upper contour qualities. In FIG. 4 the head contour 404 does not encompass the user's hair so the upper contour 406 is identified as bordering the user's forehead and the user's hair. In FIG. 5 the head contour 504 does encompass the user's hair so the upper contour 506 is identified as bordering the user's hair and a background in the video data. The background may be determined using the depth data associated with the video data.

Figure 6:
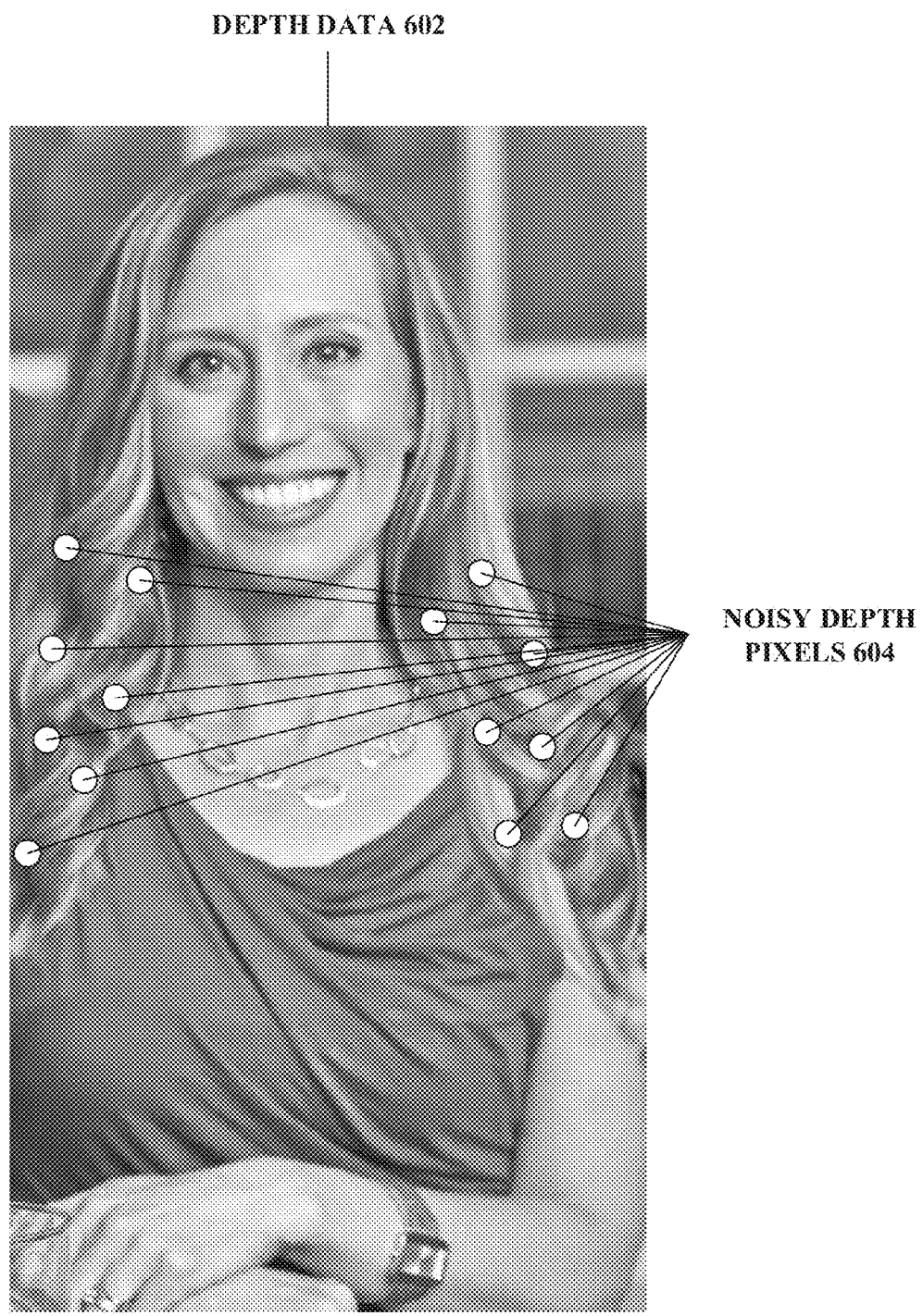
FIG. 6 depicts noisy depth-pixels, in accordance with an embodiment.

FIG. 6 depicts noisy depth-pixels, in accordance with an embodiment. In particular, FIG. 6 depicts a graphical overview 600 that includes depth data 602 and noisy depth-pixels 604. The depth data 602 may represent a first frame of depth information. The depth data 602 may be generated via a depth camera, 3-D camera, or the like and obtained via a communication interface. The depth data 602 may alternatively be obtained via a data store.

The noisy depth-pixels 604 are pixels of the depth data 602 that each have intermittent depth values. For example, within the depth data 602 there are 14 noisy depth-pixels identified as the noisy depth-pixels 604. The noisy depth-pixels 604 each had an undetectable depth value in a previous frame or a previous set of frames of depth information however, they each have detectable depth values in the current depth data 602. A noisy-depth pixel is any pixel that has sporadic depth values across a set of frames of depth information. Of course, each of the noisy depth pixels corresponds with a pixel of the video data.

Figure 7:
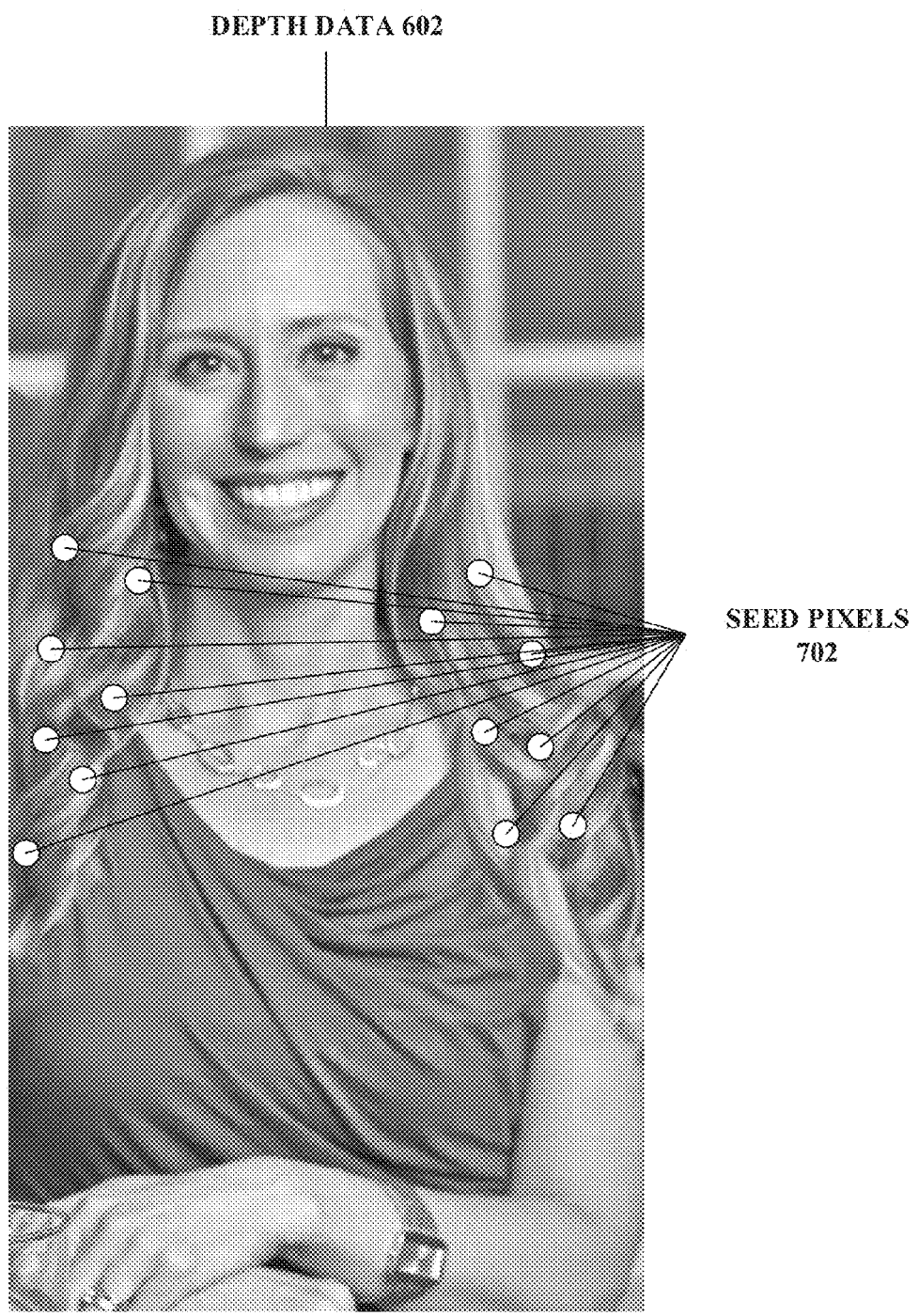
FIG. 7 depicts a first set of seed pixels selected from the noisy depth-pixels of FIG. 6, in accordance with an embodiment.

FIG. 7 depicts a first set of seed pixels selected from the noisy depth-pixels of FIG. 6, in accordance with an embodiment. In particular, FIG. 7 depicts a graphical overview 700 that includes the depth data 602 of FIG. 6 and seed pixels 702. The seed pixels 702 are a set of pixels selected from the noisy depth-pixels 604 of FIG. 6. The seed pixels 702 include every one of the noisy depth-pixels 604. In at least one embodiment, selecting seed pixels 702 for the flood fill includes (i) identifying noisy depth-pixels 604 of FIG. 6 within the obtained depth data 602, and (ii) selecting the identified noisy depth-pixels 604 of FIG. 6 as the seed pixels 702. The seed pixels 702 are to be used for the flood fill. In some embodiments, color information and depth information are stored together in one pixel. In other embodiments, color information and depth information are represented separately within frames of video data and frames of depth data respectively. The flood fill operates on the video data, therefore using the seed pixels 702 is not meant to indicate that the depth-pixels are used as input to the flood fill, but is meant to indicate that the pixels of the video data that correspond to the selected depth-pixels are used as input to the flood fill.

Figure 8:
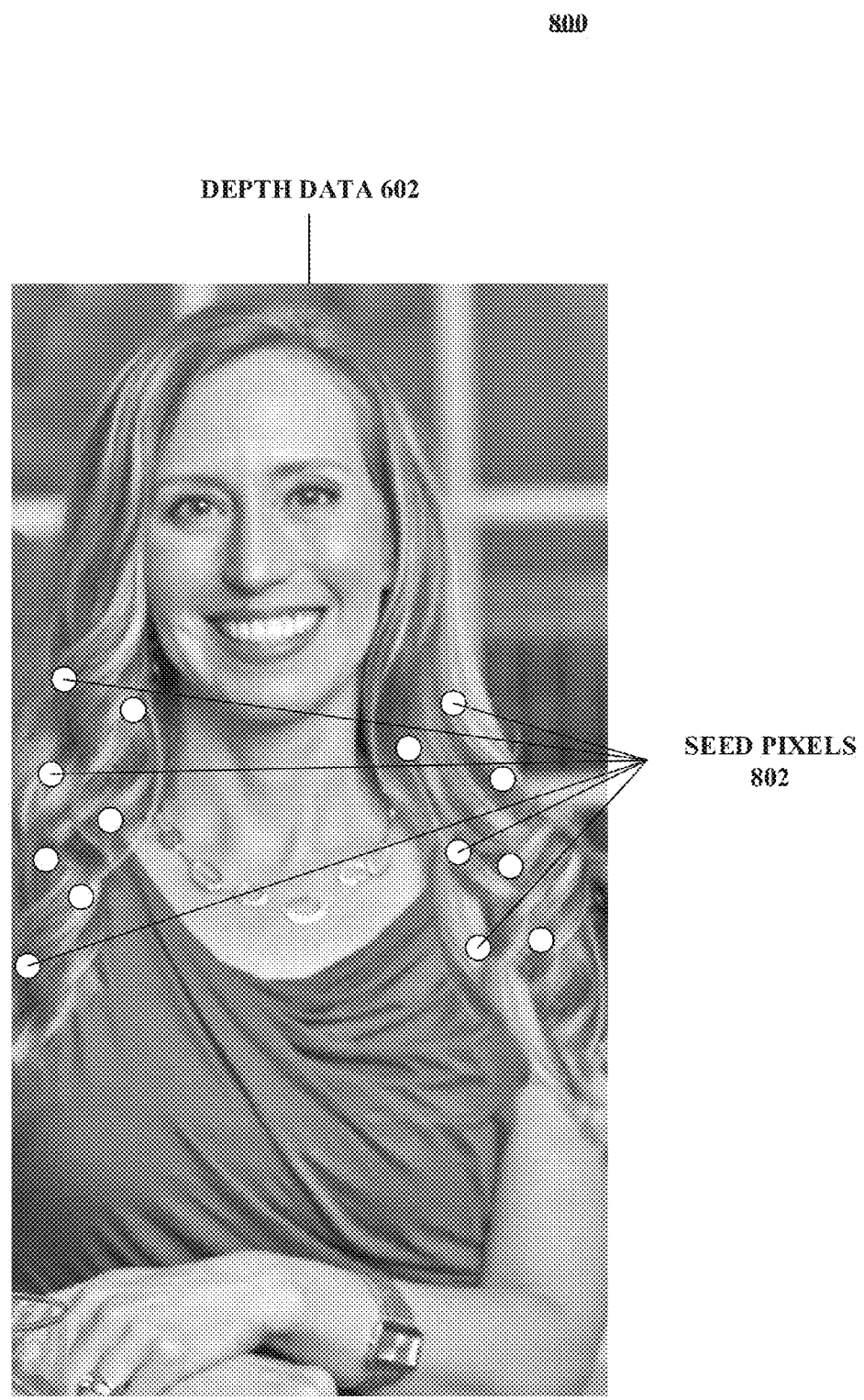
FIG. 8 depicts a second set of seed pixels selected from the noisy depth-pixels of FIG. 6, in accordance with an embodiment.

FIG. 8 depicts a second set of seed pixels selected from the noisy depth-pixels of FIG. 6, in accordance with an embodiment. In particular, FIG. 8 depicts a graphical overview 800 that includes the depth data 602 of FIG. 6 and seed pixels 802. The seed pixels 802 are a set of pixels selected from the noisy depth-pixels 604 of FIG. 6. The seed pixels 802 do not include every one of the noisy depth-pixels 604 of FIG. 6. In at least one embodiment, the selected seed pixels 802 have intermittent depth values similar to a depth value corresponding to the head of the user. Those noisy depth-pixels 604 that do not have depth values similar to a depth value corresponding to the head of the user are not included in the set of selected seed pixels 802.

In at least one embodiment, the selected seed pixels 802 are of colors that are found in a user-hair-color model. Those noisy depth-pixels 604 that are not of colors found in the user-hair-color model are not included in the set of selected seed pixels 802. In at least one further embodiment, the selected seed pixels 802 are of colors that are found a user-hair-color model at least a threshold number of times. Those noisy depth-pixels 604 that are not of colors found in the user-hair-color model at least the threshold number of times are not included in the set of selected seed pixels 802. In at least one embodiment, the selected seed pixels 802 are of colors that are not found in a background-color model. Those noisy depth-pixels 604 that are of colors found in the background-color model are not included in the set of selected seed pixels 802. In at least one further embodiment, the selected seed pixels 802 are of colors that are found a background-color model no more than a threshold number of times. Those noisy depth-pixels 604 that are of colors found in the background-color model more than the threshold number of times are not included in the set of selected seed pixels 802.

Figure 9:
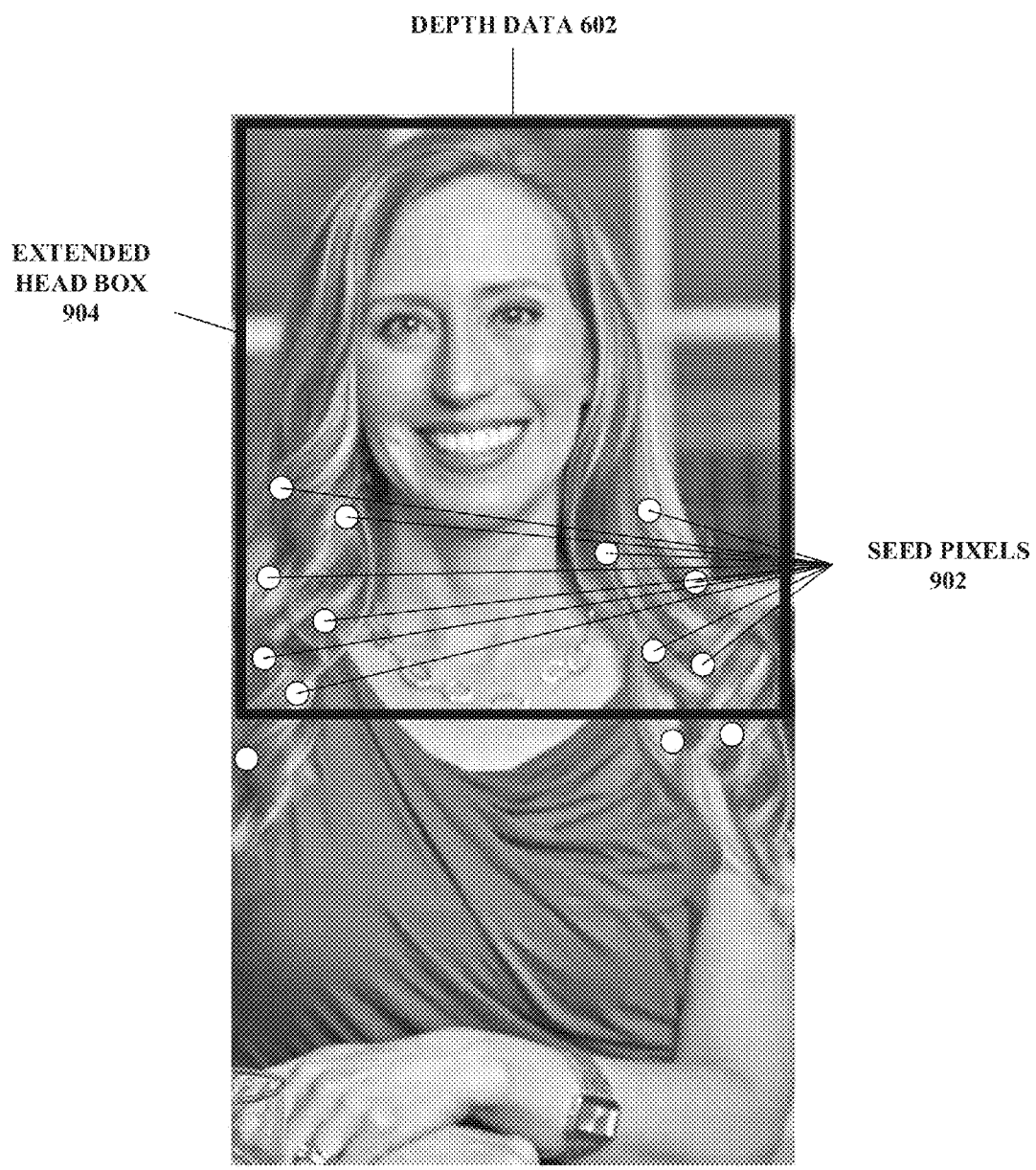
FIG. 9 depicts a third set of seed pixels selected from the noisy depth-pixels of FIG. 6, in accordance with an embodiment.

FIG. 9 depicts a third set of seed pixels selected from the noisy depth-pixels of FIG. 6, in accordance with an embodiment. In particular, FIG. 9 depicts a graphical overview 900 that includes the depth data 602 of FIG. 6, seed pixels 902, and an extended head box 904. The seed pixels 902 are a set of pixels selected from the noisy depth-pixels 604 of FIG. 6. The seed pixels 902 do not include every one of the noisy depth-pixels 604 of FIG. 6. In at least one embodiment, the selected seed pixels 902 are located within an extended head box. Those noisy depth-pixels 604 that are not of colors found in the extended head box are not included in the set of selected seed pixels 802. Selecting seed pixels for the flood fill may involve any combination of the restrictions discussed with respect to FIGS. 8-9 and the like.

In at least one embodiment, the process further includes initializing the distance-cost values of the seed pixels to be zero. In at least one embodiment, the process further includes initializing the distance-cost values of the seed pixels to be non-zero. In at least one embodiment, a first set of the selected seed pixels are on an upper contour and a second set of the selected seed pixels have intermittent depth values. In at least one such embodiment, the process further includes initializing the distance-cost values of the seed pixels in the first set to be zero and initializing the distance-cost values of the seed pixels in the second set to be non-zero.

In embodiments wherein the process further includes initializing the distance-cost values of the seed pixels in the first set to be zero and initializing the distance-cost values of the seed pixels in the second set to be non-zero, initializing the distance-cost values of the seed pixels in the second set to be non-zero may be accomplished via a variety of means. In a first example, each seed pixel in the second set is initialized with a common distance-cost value. In a second example, each seed pixel in the second set is initialized with a respective distance-cost value.

The non-zero distance-cost value be may be based, at least in part, on a density of the seed pixels in the second set. The non-zero distance-cost value be may be based, at least in part, on a distance from a seed pixel in the second set to the upper contour. The non-zero distance-cost value be may be based, at least in part, on a distance from a seed pixel in the second set to the head of the user. The non-zero distance-cost value be may be based, at least in part, on a color of the seed pixels in the second set. The non-zero distance-cost value be may be based, at least in part, on a color of the seed pixels in the second set a user-hair-color model.

Figure 10:
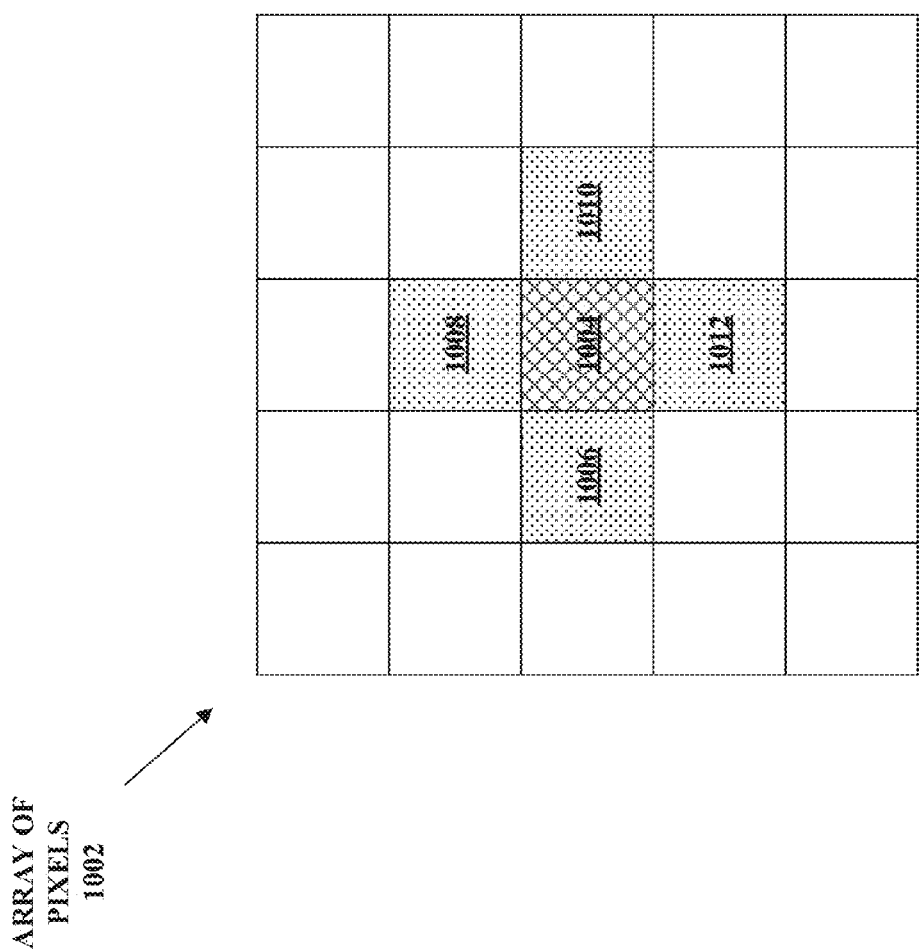
FIG. 10 depicts an array of pixels including a current pixel and a set of neighbor pixels in a first flood fill step, in accordance with an embodiment.
Figure 11:
FIG. 11 depicts an array of pixels including a current pixel and a set of neighbor pixels in a second flood fill step, in accordance with an embodiment.
Figure 12:
FIG. 12 depicts an array of pixels including a current pixel and a set of neighbor pixels in a third flood fill step, in accordance with an embodiment.

The following sections of the present disclosure discuss various steps of the flood fill. FIGS. 10-12 depict example first, second, and third steps of a flood fill respectively. A respective distance-cost value is assigned to each neighbor pixel in a set of neighbor pixels during each step of the flood fill. FIG. 10 depicts a current pixel (which in the following example is a seed pixel) and a set of neighbor pixels. FIG. 11 also depicts a current pixel and a set of neighbor pixels, however the current pixel in FIG. 11 is one of the neighbor pixels of FIG. 10. Furthermore, FIG. 12 also depicts a current pixel and a set of neighbor pixels, however the current pixel in FIG. 12 is one of the neighbor pixels of FIG. 11. Performing the flood fill includes performing a flood fill step using a current pixel and a set of neighbor pixels and then using at least one, and in some cases each of the neighbor pixels as the current pixel in later flood fill steps. In this manner, the flood fill may "fill" up an array of pixels with distance-cost values.

In at least one embodiment, performing the flood fill includes (i) identifying a plurality of neighbor pixels of a current pixel, (ii) determining respective step-cost values from the current pixel to each pixel in the plurality of neighbor pixels, and (iii) assigning each pixel in the plurality of neighbor pixels a respective distance-cost value based on a distance-cost value of the current pixel and the respective step-cost values.

In the following example (described with respect to FIGS. 10-12), a step cost value includes (i) a position-space cost value from a current pixel to a neighbor pixel and (ii) a color-space cost value from the current pixel to the neighbor pixel. This may be accomplished by employing a geodesic cost that is a combination of the position-space cost value from the current pixel to the neighbor pixel and (ii) the color-space cost value from the current pixel to the neighbor pixel. It is noted that each neighbor pixel is an equivalent position-space cost value from a given current pixel.

In other examples, a step cost value includes (i) a position-space cost value from a current pixel to a neighbor pixel and (ii) a color-space cost value from a seed pixel to the neighbor pixel. This may be accomplished by employing a geodesic cost that is a combination of the position-space cost value from the current pixel to the neighbor pixel and (ii) the color-space cost value from the seed pixel to the neighbor pixel. It is noted that each neighbor pixel is an equivalent position-space distance from a given current pixel.

In other examples, a step cost value includes (i) a position-space cost value from a current pixel to a neighbor pixel and (ii) a sum of color-space cost values along a flood fill path from a seed pixel to the neighbor pixel. This may be accomplished by employing a geodesic cost that is a combination of the position-space cost value from the current pixel to the neighbor pixel and (ii) the sum of color-space cost values along the flood fill path from the seed pixel to the neighbor pixel. It is noted that each neighbor pixel is an equivalent position-space distance from a given current pixel.

In other examples, a step cost value includes (i) a position-space cost value from a current pixel to a neighbor pixel and (ii) a color-space cost value associated with a user-hair-color model and the neighbor pixel. This may be accomplished by employing a geodesic cost that is a combination of the position-space cost value from the current pixel to the neighbor pixel and (ii) the color-space cost value between the user-hair-color model and the neighbor pixel. It is noted that each neighbor pixel is an equivalent position-space distance from a given current pixel.

FIG. 10 depicts an array of pixels including a current pixel and a set of neighbor pixels in a first flood fill step, in accordance with an embodiment. In particular FIG. 10 depicts a graphical overview 1000. The graphical overview 1000 depicts an array of pixels 1002 that includes a current pixel 1004, and neighbor pixels 1006-1012. The array of pixels 1002 represents a set of pixels that is included within the obtained video data. The size of the array of pixels 1002 is five pixels by five pixels and is not meant to be limiting in any way. Of course, other sized arrays may be used and the choice of a 5×5 array is purely for the sake of visual simplicity.

The current pixel 1004 is a seed pixel. Because the current pixel 1004 is a seed pixel, it has an initialized distance-cost value. In at least one embodiment, performing the flood fill includes identifying a plurality of neighbor pixels (i.e., the neighbor pixels 1006-1012) of a current pixel (i.e., the current pixel 1004), (ii) determining respective step-cost values from the current pixel 1004 to each pixel in the plurality of neighbor pixels 1006-1012, and (iii) assigning each pixel in the plurality of neighbor pixels 1006-1012 a respective distance-cost value based on a distance-cost value of the current pixel 1004 and the respective step-cost values.

In one example, the current pixel 1004 is black, the neighbor pixel 1006 is black, the neighbor pixel 1008 is dark grey, the neighbor pixel 1010 is black, and the neighbor pixel 1012 is yellow. The step-cost value of the neighbor pixels 1006 and 1010 are small because the neighbor pixels 1006 and 1010 are the same color as the current pixel 1004. The step-cost value of the neighbor pixel 1008 is also small, but not as small as the step-cost value of the neighbor pixels 1006 and 1010, because the neighbor pixel 1008 is a similar color to the current pixel 1004, but is not the same color as the current pixel 1004. The step-cost value of the neighbor pixel 1012 is large because the neighbor pixel 1012 is a vastly different color than the current pixel 1004. Resultantly, the distance-cost value assigned to the neighbor pixels 1006 and 1010 are the same and the smallest of this example. The distance-cost value assigned to the neighbor pixel 1008 is larger than the distance-cost value assigned to the neighbor pixels 1006 and 1010. The distance-cost value assigned to the neighbor pixel 1012 is the largest of this example.

FIG. 11 depicts an array of pixels including a current pixel and a set of neighbor pixels in a second flood fill step, in accordance with an embodiment. In particular FIG. 11 depicts a graphical overview 1100. The graphical overview 1100 depicts the array of pixels 1002 of FIG. 10. In this second step of the flood fill, the neighbor pixel 1008 of FIG. 10 is now described as a current pixel 1008 and the current pixel 1004 of FIG. 10 is now described as a neighbor pixel 1004. As depicted in the graphical overview 1100, the current pixel 1008 has neighbor pixels 1102-1106 and 1004. The current pixel 1008 is not a seed pixel, and it has a non-zero distance-cost value (which was assigned in the first step of the flood fill as depicted in FIG. 10).

Furthering the example discussed with respect to FIG. 10, the current pixel 1008 is dark grey, the neighbor pixel 1102 is black, the neighbor pixel 1104 is dark grey, the neighbor pixel 1106 is black, and the neighbor pixel 1004 is black. The step-cost value of the neighbor pixel 1104 is small because the neighbor pixel 1104 is the same color as the current pixel 1008. The step-cost values of the neighbor pixels 1102, 1106, and 1004 are also small, but not as small as the step-cost value of the neighbor pixel 1104, because the neighbor pixels 1102, 1106, and 1004 are a similar color to the current pixel 1008, but the neighbor pixels 1102, 1106, and 1004 are not the same color as the current pixel 1008. Resultantly, the distance-cost value assigned to the neighbor pixel 1104 is small in this example, however it must be greater than the distance-cost value assigned to the current pixel 1008 because the distance-cost value is a running sum. The distance-cost value assigned to the neighbor pixels 1102 and 1106 is larger than the distance-cost value assigned to the neighbor pixels 1104. The distance-cost value assigned to the neighbor pixel 1004 is unchanged from the last step of the flood fill because it is larger than the previously assigned distance-cost value (i.e., the flood fill process does not re-assign distance cost values if the new value is larger than the old value). This is consistent with embodiments wherein, performing the flood fill includes (i) determining a minimum distance-cost value from at least one of the selected seed pixels to a candidate pixel (e.g., the neighbor pixel 1110), and (ii) assigning the candidate pixel (e.g., the neighbor pixel 1110) a distance-cost value that is the determined minimum distance-cost value.

FIG. 12 depicts an array of pixels including a current pixel and a set of neighbor pixels in a third flood fill step, in accordance with an embodiment. In particular FIG. 12 depicts a graphical overview 1200. The graphical overview 1200 depicts the array of pixels 1002 of FIG. 10. In this third step of the flood fill, the neighbor pixel 1106 of FIG. 11 is now described as a current pixel 1106 and the current pixel 1008 of FIG. 11 is now described as a neighbor pixel 1008. As depicted in the graphical overview 1200, the current pixel 1106 has neighbor pixels 1008, 1202, 1204, and 1010. The current pixel 1106 is not a seed pixel, and it has a non-zero distance-cost value (which was assigned in the second step of the flood fill as depicted in FIG. 11).

Furthering the example discussed with respect to FIGS. 10 and 11, the current pixel 1106 is black, the neighbor pixel 1008 is dark grey, the neighbor pixel 1202 is dark grey, the neighbor pixel 1204 is dark grey, and the neighbor pixel 1010 is black. The step-cost value of the neighbor pixel 1010 is small because the neighbor pixel 1010 is the same color as the current pixel 1106. The step-cost values of the neighbor pixels 1008, 1202, and 1204 are also small, but not as small as the step-cost value of the neighbor pixel 1010, because the neighbor pixels 1008, 1202, and 1204 are a similar color to the current pixel 1106, but the neighbor pixels 1008, 1202, and 1204 are not the same color as the current pixel 1106. Resultantly, the distance-cost values assigned to the neighbor pixels 1008 and 1010 are unchanged. The distance-cost values assigned to the neighbor pixels 1202 and 1204 are larger than the distance-cost values previously assigned to the neighbor pixels 1008 and 1010. The distance-cost values assigned to the neighbor pixel 1008 and 1010 are unchanged from the last step of the flood fill because they are larger than the previously assigned distance-cost values. This is consistent with embodiments wherein, performing the flood fill includes (i) determining a minimum distance-cost value from at least one of the selected seed pixels to a candidate pixel, and (ii) assigning the candidate pixel a distance-cost value that is the determined minimum distance-cost value.

Figure 13:
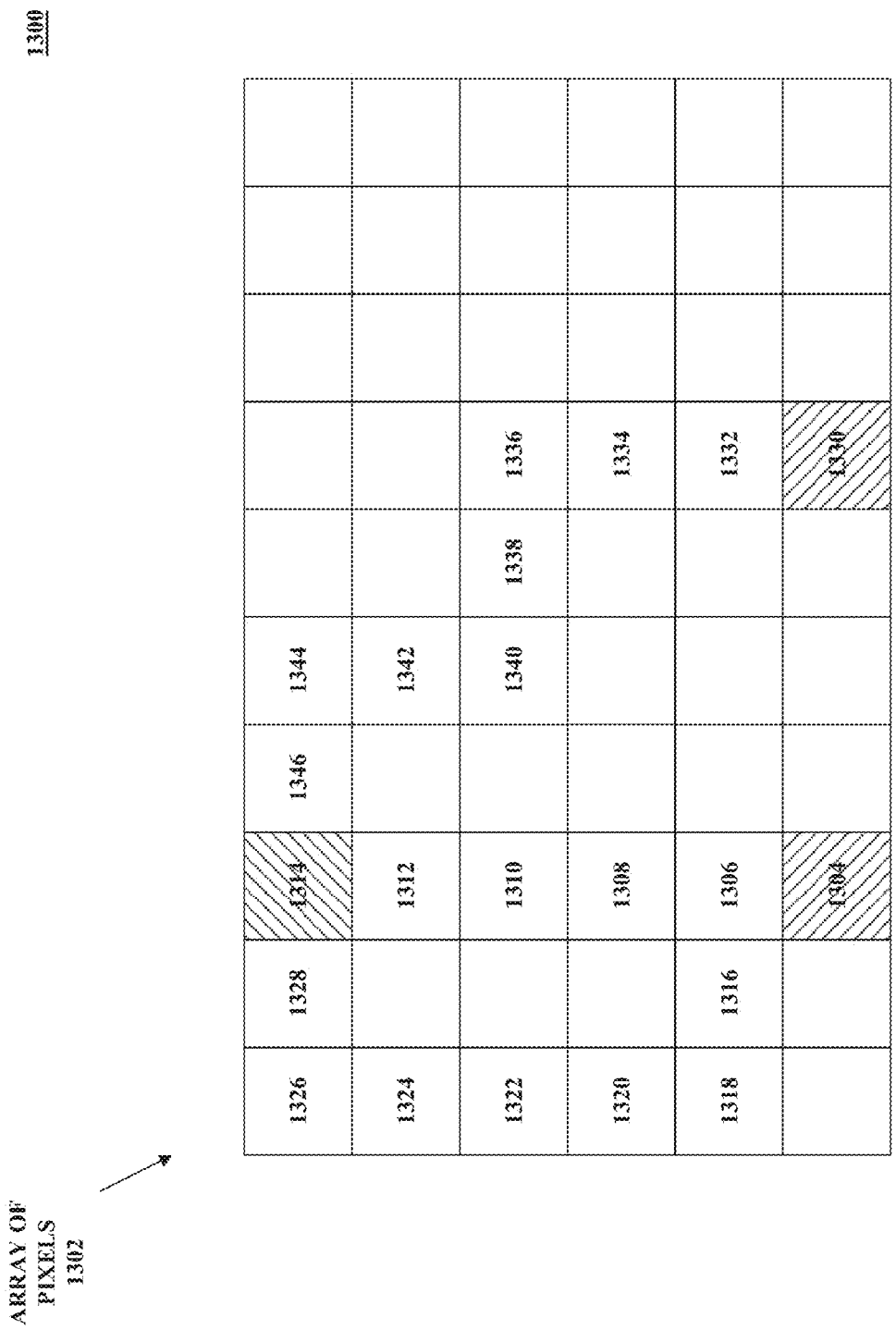
FIG. 13 depicts an array of pixels including two seed pixels and a given pixel, in accordance with an embodiment.

FIG. 13 depicts an array of pixels including two seed pixels and a given pixel, in accordance with an embodiment. In particular, FIG. 13 depicts a graphical overview 1300. The graphical overview 1300 depicts an array of pixels 1302 that includes pixels 1304-1346. The array of pixels 1302 represents a set of pixels that is included within the obtained video data. The size of the array of pixels 1302 is ten pixels by six pixels and is not meant to be limiting in any way. Of course, other sized arrays may be used and the choice of a 10x6 array is purely for the sake of visual simplicity.

The pixels 1304 and 1330 are seed pixels. The pixel 1314 is a pixel-of-interest in the given example. It may be referred to as a given pixel or a current pixel.

Depicted in the graphical overview 1300, there are three unique flood fill paths that originate from a seed pixel and terminate at the given pixel (i.e., the pixel 1314). A first path is defined by the pixels 1304-1313. A second path is defined by the pixels 1304-1306, 1316-1328, and 1316. A third path is defined by the pixels 1330-1346 and 1314.

Each of the three flood fill paths is an example of a set of flood fill steps. The first path has a position-space cost value of 5 pixels from the seed pixel 1304 to the given pixel 1314 (i.e., it costs 5 flood fill steps to get from the seed pixel 1304 to the given pixel 1314 along the first flood fill path or the flood fill must traverse 5 pixels to get from the seed pixel 1304 to the given pixel 1314 along the first flood fill path). The second path has a position-space cost value of 9 pixels from the seed pixel 1304 to the given pixel 1314. The third path has a position-space cost value of 9 from the seed pixel 1330 to the given pixel 1314.

The color-space cost value associated with the given pixel 1314 may be calculated in a plurality of ways. In at least one embodiment, the distance-cost value of the given pixel (i.e., the pixel 1314) includes (i) a position-space cost value from a seed pixel (either the seed pixel 1304 or the seed pixel 1330) to the given pixel 1314 and (ii) a color-space cost value from the seed pixel (either the seed pixel 1304 or the seed pixel 1330) to the given pixel 1314.

In at least one embodiment, the distance-cost value of a given pixel is a geodesic cost from a seed pixel (either the seed pixel 1304 or the seed pixel 1330) to the given pixel 1314. The geodesic cost is a combination of a position-space cost value from the seed pixel (either the seed pixel 1304 or the seed pixel 1330) to the given pixel 1314 and (ii) a color-space cost value from the seed pixel (either the seed pixel 1404 or the seed pixel 1330) to the given pixel 1314.

In at least one embodiment, performing the flood fill includes (i) determining a minimum distance-cost value from at least one of the selected seed pixels (either the seed pixel 1304 or the seed pixel 1330) to a candidate pixel (i.e., the given pixel 1314), and (ii) assigning the candidate pixel a distance-cost value that is the determined minimum distance-cost value.

In a first possibility, the color-space cost value associated with the given pixel 1314 is seed pixel and path independent. In the first possibility, the color-space cost value is based on a user-hair-color model and the given pixel 1314. The color-space cost value may be calculated by using the value of the user-hair-color model at the color of the given pixel 1314. The color-space cost value may be calculated using a difference between a mean color of the user-hair-color model and the given pixel 1314. The color-space cost value may be calculated using a difference between a mode color of the user-hair-color model and the given pixel 1314. The color-space cost value may be calculated using a difference between a median color of the user-hair-color model and the given pixel 1314. Of course, other techniques (which may or may not employ statistical parameters associated with the user-hair-color model) may be used to calculate the color-space cost value of the given pixel 1314.

In a second possibility, the color-space cost value associated with the given pixel 1314 is path independent and seed pixel dependent. In the second possibility, the color-space cost value is based on a color difference between a seed pixel and the given pixel 1314. In FIG. 13 there are two possible color-space cost values in the context of the second possibility (one associated with the seed pixel 1304 and another associated with the seed pixel 1330).

In a third possibility, the color-space cost value associated with the given pixel 1314 is path dependent (and as a result of logical dependency, seed pixel dependent). In the third possibility, the color-space cost value is a summation of color differences accumulated along a given path. In FIG. 13 there are three possible color-space cost values in the context of the third possibility (corresponding to the three paths—two associated with the seed pixel 1304 and one associated with the seed pixel 1330). In each step of the flood fill, a step-cost value associated with a neighbor pixel is calculated as described with respect to FIG. 10-12.

In the second and third possibilities the assigned distance-cost value is the smallest distance-cost value of the available options. In at least one embodiment, determining the minimum distance-cost value includes comparing a current distance-cost value corresponding with a current path (e.g., the second path) to a prior distance-cost value corresponding with a prior path (e.g., the first path). In at least one such embodiment, the current path and the prior path originate from a common seed pixel (e.g., the first and second paths and the seed pixel 1304). In at least one other such embodiment, the current path and the prior path originate from different seed pixels (e.g., the first and third paths and the seed pixels 1304 and 1330).

In at least one embodiment, performing the flood fill comprises performing the flood fill along a plurality of flood-fill paths. In at least one such embodiment the process further includes terminating the flood fill along a current flood-fill path in response to at least one termination criteria. The termination criteria includes a current pixel not being a user-hair color according to a user-hair-color model, the current pixel being a background color according to a background-color model, a distance-cost value of the current pixel being greater than a distance-cost threshold, and a step-cost value of the current pixel being greater than a step-cost threshold. Of course many other termination criteria could be employed as well such as a position-space-cost value of the current pixel being greater than a position-space-cost threshold and a color-space-cost value of the current pixel being greater than a color-space-cost threshold.

Figure 14:
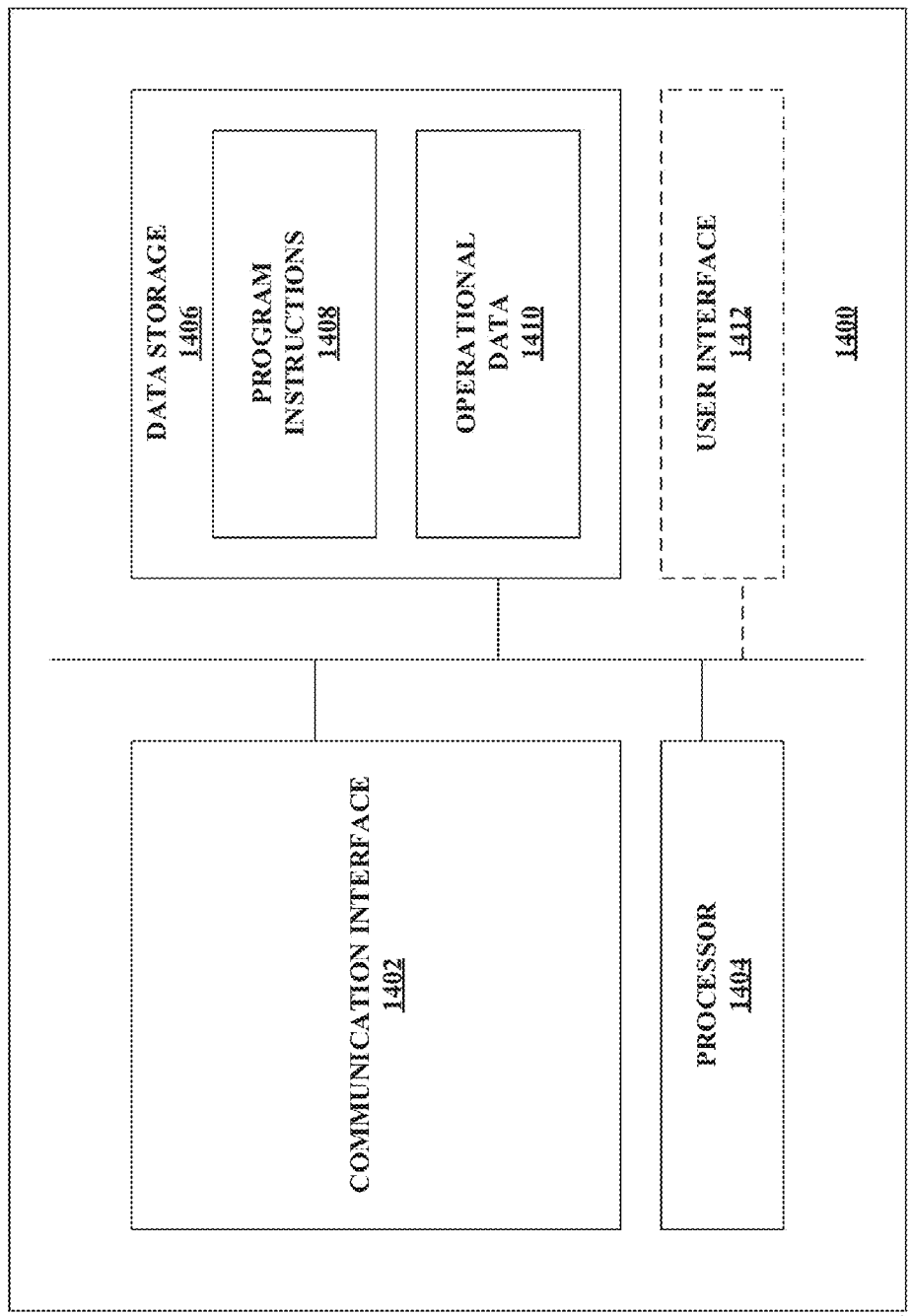
FIG. 14 depicts an example computing and communication device (CCD), in accordance with an embodiment.

FIG. 14 depicts an example computing and communication device (CCD), in accordance with an embodiment. In the embodiment that is depicted in FIG. 14, an example CCD 1400 includes a communication interface 1402, a processor 1404, and data storage 1406 containing instructions 1408 executable by the processor 1404 for causing the CCD 1400 to carry out a set of functions, which may include those functions described above in connection with FIG. 1. As a general matter, the example CCD 1400 is presented as an example system that could be programmed and configured to carry out the functions described herein.

The communication interface 1402 may include one or more wireless-communication interfaces (for communicating according to, e.g., APCO P25, TETRA, DMR, LTE, Wi-Fi, NFC, Bluetooth, and/or one or more other wireless-communication protocols) and/or one or more wired-communication interfaces (for communicating according to, e.g., Ethernet, USB, eSATA, IEEE 1394, and/or one or more other wired-communication protocols). As such, the communication interface 1402 may include any necessary hardware (e.g., chipsets, antennas, Ethernet cards, etc.), any necessary firmware, and any necessary software for conducting one or more forms of communication with one or more other entities as described herein. The processor 1404 may include one or more processors of any type deemed suitable by those of skill in the relevant art, some examples including a general-purpose microprocessor and a dedicated digital signal processor (DSP).

The data storage 1406 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 14, the data storage 1406 contains program instructions 1408 executable by the processor 1404 for carrying out various functions, and also contains operational data 1410, which could include any one or more types of data stored and/or accessed by the example CCD 1400 during operation. In embodiments in which a computing system such as the example CCD 1400 is arranged, programmed, and configured to carry out processes such as the example process that is described above in connection with FIG. 1, the program instructions 1408 are executable by the processor 1404 for carrying out those functions; in instances where other entities described herein have a structure similar to that of the example CCD 1400, the respective program instructions 1408 for those respective devices are executable by their respective processors 1404 to carry out functions respectively performed by those devices.

If present, the user interface 1412 may include one or more input devices (a.k.a. components and the like) and/or one or more output devices (a.k.a. components and the like). With respect to input devices, the user interface 1412 may include one or more touchscreens, buttons, switches, microphones, and the like. With respect to output devices, the user interface 1412 may include one or more displays, speakers, light emitting diodes (LEDs), and the like. Moreover, one or more components (e.g., an interactive touchscreen-and-display component) of the user interface 1412 could provide both user-input and user-output functionality. And certainly other user-interface components could be used in a given context, as known to those of skill in the art. Furthermore, the CCD 1400 may include one or more video cameras, depth cameras, 3-D cameras, infrared-visible cameras, light-field cameras or a combination thereof.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 1%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    obtaining video data depicting a head of a user;
    obtaining depth data associated with the video data;
    selecting seed pixels for a hair-identification flood fill for identifying pixels depicting hair of the head of the user, the seed pixels selected at least in part by using the obtained depth data;
    performing the hair-identification flood fill from the selected seed pixels, the hair-identification flood fill assigning respective distance-cost values to pixels of the video data based on respective position-space-cost values and respective color-space-cost values, wherein performing the hair-identification flood fill comprises:
        identifying a plurality of neighbor pixels of a current pixel;
        determining respective step-cost values from the current pixel to each pixel in the plurality of neighbor pixels; and
        assigning each pixel in the plurality of neighbor pixels a respective distance-cost value based on a distance-cost value of the current pixel and the respective step-cost values; and
    identifying, using a foreground identification process, a persona of the user from the video data, wherein the respective distance-cost values assigned to pixels by the hair-identification flood fill is one of a plurality of inputs of the foreground identification process.

2. The method of claim 1, wherein selecting seed pixels for the hair-identification flood fill further comprises selecting seed pixels for the hair-identification flood fill at least in part by using the video data.

3. The method of claim 1, further comprising:
    obtaining a head contour that estimates an outline of the depicted head of the user, the head contour being based at least in part on the depth data associated with the video data,
    wherein the selected seed pixels are on an upper contour, wherein the upper contour is an upper portion of the head contour.

4. The method of claim 3, wherein the selected seed pixels are equally distributed along the upper contour.

5. The method of claim 3, wherein the selected seed pixels are of colors that are found in a user-hair-color model.

6. The method of claim 1, wherein selecting seed pixels for the hair-identification flood fill comprises:
    identifying pixels having noisy depth values over a series of frames; and
    selecting the identified noisy depth-pixels as seed pixels for the hair-identification flood fill.

7. The method of claim 6, wherein the selected seed pixels are located within an extended head box.

8. The method of claim 6, wherein the selected seed pixels have intermittent depth values that are within a threshold tolerance of a depth value corresponding to the head of the user.

9. The method of claim 6, wherein the selected seed pixels are of colors that are found in a user-hair-color model.

10. The method of claim 1, wherein a first set of the selected seed pixels are on an upper contour and a second set of the selected seed pixels have noisy depth values over a series of frames, wherein the upper contour is an upper portion of a head contour that estimates an outline of the depicted head of the user, the method further comprising:
   initializing the distance-cost values of the seed pixels in the first set to be zero; and
   initializing the distance-cost values of the seed pixels in the second set to be non-zero.

11. The method of claim 1, wherein performing the hair-identification flood fill comprises:
   determining a minimum distance-cost value from at least one of the selected seed pixels to a current pixel; and
   assigning the current pixel a distance-cost value that is the determined minimum distance-cost value.

12. The method of claim 11, wherein determining a minimum distance-cost value comprises:
   comparing a current distance-cost value corresponding with a current flood-fill path to a prior distance-cost value corresponding with a prior flood-fill path.

13. The method of claim 12, wherein the current flood-fill path and the prior flood-fill path originate from a common seed pixel.

14. The method of claim 12, wherein the current flood-fill path and the prior flood-fill path originate from different seed pixels.

15. The method of claim 1, wherein performing the hair-identification flood fill comprises performing the hair-identification flood fill along a plurality of flood-fill paths, the method further comprising:
   terminating the hair-identification flood fill along a current flood-fill path in response to at least one termination criteria, the termination criteria comprising:
      a current pixel not being a user-hair color according to a user-hair-color model;
      the current pixel being a background color according to a background-color model;
      a distance-cost value to the current pixel being greater than a distance-cost threshold; and
      a step-cost value to the current pixel being greater than a step-cost threshold.

16. A system comprising:
   a communication interface;
   a processor; and
   data storage containing instructions executable by the processor for causing the system to carry out a set of functions, the set of functions including:
      obtaining video data depicting a head of a user;
      obtaining depth data associated with the video data;
      selecting seed pixels for a hair-identification flood fill for identifying pixels depicting hair of the head of the user, the seed pixels selected at least in part by using the depth data;
      performing the hair-identification flood fill from the selected seed pixels, the hair-identification flood fill assigning respective distance-cost values to pixels of the video data based on respective position-space-cost values and respective color-space-cost values, wherein performing the hair-identification flood fill comprises:
         identifying a plurality of neighbor pixels of a current pixel;
         determining respective step-cost values from the current pixel to each pixel in the plurality of neighbor pixels; and
         assigning each pixel in the plurality of neighbor pixels a respective distance-cost value based on a distance-cost value of the current pixel and the respective step-cost values; and
      identifying, using a foreground identification process, a persona of the user from the video data, wherein the respective distance-cost values assigned to pixels by the hair-identification flood fill is one of a plurality of inputs of the foreground identification process.

* * * * *